US012603294B2

(12) United States Patent
Choi et al.

(10) Patent No.: US 12,603,294 B2
(45) Date of Patent: Apr. 14, 2026

(54) LITHIUM-ION SUPPLY ELECTRODE FOR REAL-TIME MICROSCOPIC ANALYSIS AND METHOD OF MANUFACTURING SAME

(71) Applicant: POSTECH Research and Business Development Foundation, Pohang-si (KR)

(72) Inventors: Si-Young Choi, Pohang-si (KR); Byoungwoo Kang, Pohang-si (KR); Yu-Jeong Yang, Pohang-si (KR); So-Yeon Kim, Pohang-si (KR); Abin Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 661 days.

(21) Appl. No.: 18/088,857

(22) Filed: Dec. 27, 2022

(65) Prior Publication Data

US 2023/0327127 A1 Oct. 12, 2023

(30) Foreign Application Priority Data

Apr. 11, 2022 (KR) ........................ 10-2022-0044556
Oct. 7, 2022 (KR) ........................ 10-2022-0128815

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0407* (2013.01); *H01M 4/382* (2013.01);
(Continued)

(58) Field of Classification Search
CPC .... H01M 4/528; H01M 4/0407; H01M 4/382; H01M 10/0525; H01M 10/0562; H01M 2300/0071
See application file for complete search history.

(56) References Cited

U.S. PATENT DOCUMENTS

2005/0008938 A1* 1/2005 Cho ...................... H01M 4/134
429/246
2010/0104948 A1* 4/2010 Skotheim ................ H01M 4/38
429/204
(Continued)

FOREIGN PATENT DOCUMENTS

JP 2004-259483 9/2004
JP 6323490 5/2018
(Continued)

OTHER PUBLICATIONS

Chen, Lithium metal protected by atomic layer deposition metal oxide for high performance anodes, J. Mater. Chem. A, 2017, 5, 12297-12309 (Year: 2017).*

(Continued)

*Primary Examiner* — Matthew J Merkling
(74) *Attorney, Agent, or Firm* — LEX IP MEISTER, PLLC

(57) ABSTRACT

Disclosed are a lithium-ion supply electrode for real-time microscopic analysis and a method of manufacturing same. The lithium-ion supply electrode includes a solid electrolyte layer including a solid electrolyte, a lithium layer formed on the solid electrolyte layer and including lithium, and a protective layer formed on the lithium layer and including a metal. Therefore, lithium in the electrode does not undergo oxidation in a short time. Therefore, the lithium-ion supply electrode can be used for real-time analysis of structural (Continued)

changes and interfacial reactions of lithium secondary battery materials using a transmission electron microscope.

10 Claims, 22 Drawing Sheets

(51) Int. Cl.
  *H01M 4/38*       (2006.01)
  *H01M 10/0525*    (2010.01)
  *H01M 10/0562*    (2010.01)

(52) U.S. Cl.
  CPC ... *H01M 10/0525* (2013.01); *H01M 10/0562*
  (2013.01); *H01M 2300/0071* (2013.01)

(56) References Cited

U.S. PATENT DOCUMENTS

| | | | | |
|---|---|---|---|---|
| 2010/0129699 | A1* | 5/2010 | Mikhaylik | H01M 4/1395 |
| | | | | 429/231.95 |
| 2011/0311883 | A1* | 12/2011 | Oukassi | H01M 6/18 |
| | | | | 216/13 |
| 2015/0099187 | A1* | 4/2015 | Cui | H01M 4/366 |
| | | | | 429/209 |
| 2017/0214054 | A1* | 7/2017 | Cui | H01M 50/46 |
| 2017/0324097 | A1* | 11/2017 | Lee | H01M 10/4235 |
| 2019/0348668 | A1* | 11/2019 | Kim | H01M 10/052 |
| 2022/0069346 | A1* | 3/2022 | Yamamoto | H01M 10/0562 |

FOREIGN PATENT DOCUMENTS

| | | |
|---|---|---|
| JP | 2021-132031 | 9/2021 |
| JP | 7038488 | 3/2022 |
| WO | 2021210446 | 10/2021 |

OTHER PUBLICATIONS

Lindsey, In situ and operando microscopy studies on lithium metal anodes: a review, Engergy Adv. 5, 7-42 (Year: 2026).*

Lodico, Operando spectral imaging of the lithium ion batteryâs solid-electrolyte interphase, Sci. Adv. 9, eadg5135 (2023) (Year: 2023).*

KIPO, PCT International Search Report of PCT/KR2022/015791 dated Apr. 24, 2023.

KIPO, Office Action of KR 10-2022-0128815 dated Jun. 11, 2024.

Eric Kazyak et al., "Li Penetration in Ceramic Solid Electrolytes: Operando Microscopy Analysis of Morphology, Propagation, and Reversibility", Matter, vol. 2, Issue 4, Apr. 1, 2020, total 46 pages.

Motohiro Nagao et al., "In situ SEM study of a lithium deposition and dissolution mechanism in a bulk-type solid-state cell with a Li2S-P2S5 solid electrolyte", Physical Chemistry Chemical Physics, vol. 15, No. 42, Jan. 1, 2013, total 7 pages.

Feng Wang et al., "Tracking lithium transport and electrochemical reactions in nanoparticles", Nature Communications vol. 3, No. 1, Nov. 13, 2012, total 8 pages.

EPO, Office Action of EP 22937568.8 dated Feb. 3, 2026, total 8 pages.

* cited by examiner

PROTECTIVE LAYER
(6 um)

LITHIUM LAYER
(5 um)

SOLID ELECTROLYTE LAYER

FIG. 5A

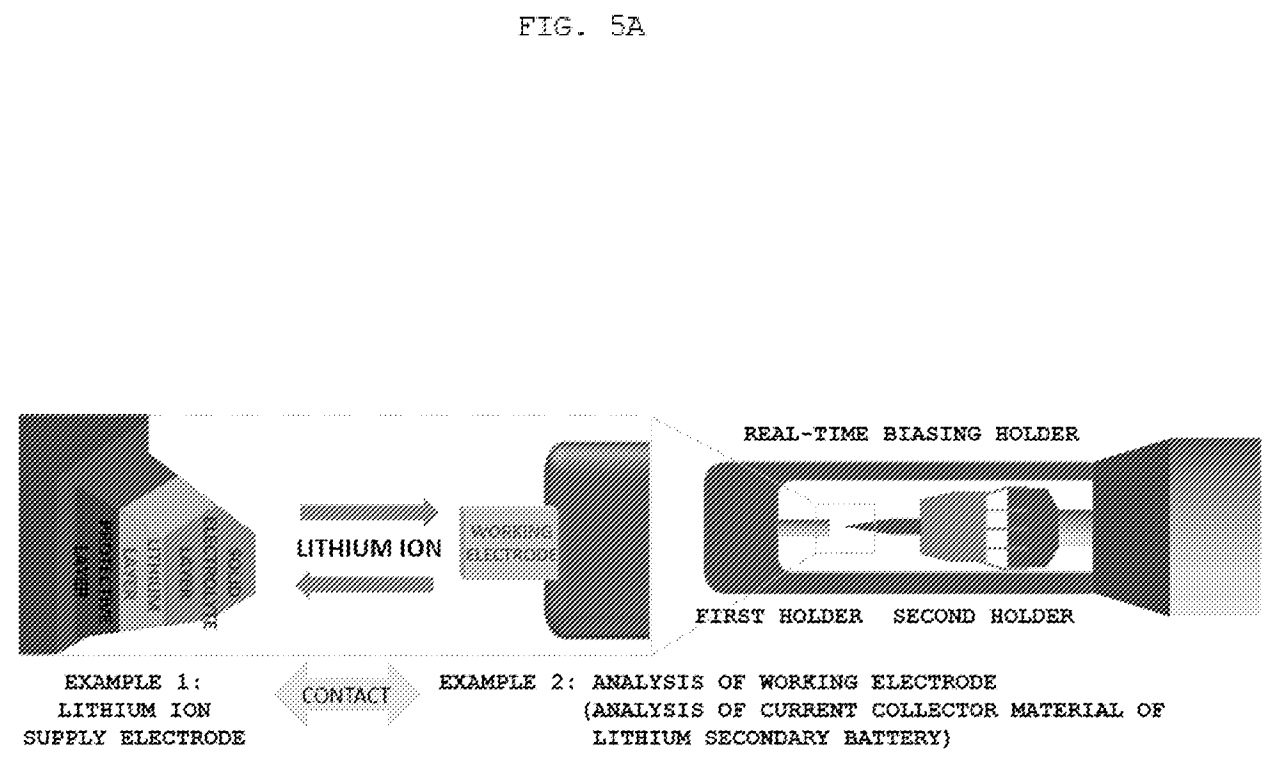

REAL-TIME BIASING HOLDER

FIRST HOLDER  SECOND HOLDER

LITHIUM ION

CONTACT

PROTECTIVE LAYER

EXAMPLE 1:
LITHIUM ION
SUPPLY ELECTRODE

EXAMPLE 2: ANALYSIS OF WORKING ELECTRODE
(ANALYSIS OF CURRENT COLLECTOR MATERIAL OF
LITHIUM SECONDARY BATTERY)

1.5 cm 10 um

~ 8 pA

~ 8 pA

LITHIUM-ION SUPPLY ELECTRODE FOR REAL-TIME MICROSCOPIC ANALYSIS AND METHOD OF MANUFACTURING SAME

CROSS REFERENCE TO RELATED APPLICATION

The present application claims priority to Korean Patent Application No. 10-2022-0128815, filed Oct. 7, 2022, and Korean Patent Application No. 10-2022-0044556, filed Apr. 11, 2022, the entire contents of which are incorporated herein for all purposes by this reference.

BACKGROUND OF THE INVENTION

1. Field of the Invention

The present disclosure relates to a lithium-ion supply electrode for real-time transmission electron microscopy and a method of manufacturing the same. The present disclosure relates to a lithium-ion supply electrode and a method of manufacturing the same, the electrode including a metal-containing protective layer to inhibit oxidation of lithium while a lithium secondary battery material is being loaded in a holder for real-time analysis.

2. Description of the Related Art

At the present, most lithium-ion supply electrodes used for transmission electron microscopy (TEM) analysis are made by wetting a metal tip with liquid lithium in a glovebox. The metal tip is loaded into a TEM holder in the air for a brief period of time. For this brief period of time, lithium is exposed to the air and oxidized to lithium oxide ($Li_2O$). This lithium oxide, which acts as a solid electrolyte, is brought into contact with a lithium secondary battery material and a voltage is applied for analysis. Lithium oxide ($Li_2O$) has a significantly low lithium-ion conductivity compared to materials that are currently being studied and used as solid electrolytes. This lithium-ion conductivity difference leads to an overvoltage than a real battery environment. Since the conditions of a test electrode differ from the conditions of an actual electrode, this test cannot be considered a test of an actual lithium secondary battery material using a solid electrolyte. In addition, in the case of manufacturing a lithium-ion supply electrode by wetting a metal tip with liquid lithium in a glove box, the glove box must be located near a microscope so that the electrode can be loaded into a holder within a short time to prevent the oxidization of lithium in air. However, since the transmission electron microscope is particularly sensitive to light and vibration, it is not easy for the microscope and the glove box to be installed close to each other due to vibrations generated by the pump of the glove box.

In addition, a liquid holder for providing a liquid environment is required to perform real-time charging and discharging tests in a liquid environment. However, it is difficult to use the liquid holder due to the high price of the equipment. In addition, since TEM images using a liquid holder are obtained from the electron beams having transmitted through a liquid environment, these images may be relatively unclear and obscure compared to images obtained from electron beams having passed through a vacuum environment. However, it is difficult to do real-time microscopic analysis with a liquid electrolyte on a metal tip to obtain clean images without using a liquid holder because the liquid electrolyte cannot be present in a high vacuum environment of the transmission electron microscope and there is a possibility that the liquid electrolyte is solidified by electron beams.

Therefore, to perform real-time analysis of lithium secondary battery materials, it is necessary to develop a lithium-ion supply electrode that can be maintained in the air for a long time and that uses a solid electrolyte having a high lithium-ion conductivity.

SUMMARY OF THE INVENTION

The present disclosure has been made in view of the problems occurring in the related art and an objective of the present disclosure is to provide a lithium-ion supply electrode and a method of manufacturing the same. By the electrode and method of the present disclosure, a solid electrolyte with high lithium-ion conductivity is used for real-time analysis of secondary battery materials in a charging and discharging environment, and lithium is not oxidized but is maintained during the loading of the electrode to a holder.

In addition, there is provided a small lithium-ion supply electrode can be used to analyze microstructural changes and interfacial reactions of a lithium secondary battery by using equipment sensitive to light and vibration, such as a transmission electron microscope (TEM).

According to one aspect of the present disclosure, there is provided a lithium-ion supply electrode including: a solid electrolyte layer including a solid electrolyte; a lithium layer formed on the solid electrolyte layer and including lithium; and a protective layer formed on the lithium layer and including a metal.

In addition, the lithium layer may have a thickness of 0.5 μm to 10 μm.

The metal included in the protective layer may be one or more metals selected from the group consisting of copper (Cu), gold (Au), silver (Ag), and nickel (Ni).

In addition, the metal included in the protective layer may be copper (Cu).

In addition, the protective layer may have a thickness of 0.5 μm to 10 μm.

In addition, the area of the solid electrolyte layer that is parallel to the lithium layer decreases with an increasing distance from the lithium layer.

In addition, the solid electrolyte layer may have any one shape selected from the group consisting of a circular cone shape, an elliptical cone shape, a flat plate, and a polypyramid shape.

In addition, the solid electrolyte may be one or more electrolytes selected from the group consisting of an oxide-based solid electrolyte, a sulfide-based solid electrolyte, a phosphide-based solid electrolyte, a silicide-based solid electrolyte, and combinations thereof.

In addition, the solid electrolyte layer may have a thickness of 0.5 μm to 85 mm.

In addition, the lithium-ion supply electrode may be used to analyze a lithium secondary battery material in a charging and discharging process of a lithium secondary battery, using any one selected from the group consisting of a transmission electron microscope (TEM), a scanning electron microscope (SEM), an optical microscope (OM), and a scanning probe microscope (SPM).

According to another aspect of the present disclosure, there is provided a method of manufacturing a lithium-ion supply electrode, the method including: (a) forming a liquid-phase lithium layer on a solid electrolyte layer under inert gas conditions and at a temperature of a melting point of lithium or above the melting point of lithium and forming a protective layer including a metal on the liquid-phase lithium layer, thereby preparing a laminate including the solid electrolyte layer, the lithium layer, and the protective layer; and (b) separating a portion of the laminate such that the separated portion has a predetermined shape, using a focused ion beam apparatus, at a temperature lower than the melting point of lithium, thereby producing a lithium-ion supply electrode including the solid electrolyte layer, the lithium layer, and the protective layer.

In addition, step (a) may be performed at a temperature in a range of 180.5° C. to 500° C.

In the method, the step may include: (a-1) wetting the solid electrolyte layer with liquid lithium to form a laminate of the solid electrolyte layer and the liquid-phase lithium layer; and (a-2) placing the protective layer including a metal on the liquid-phase lithium layer to prepare the laminate of the solid electrolyte layer, the lithium layer, and the protective layer.

The step (a) may further include (a-1') of adjusting the thickness of the liquid-phase lithium layer by adding liquid lithium to the liquid-phase lithium layer or removing some liquid lithium from the liquid-phase lithium layer at a temperature of a melting point of lithium or above the melting point of lithium, the step (a-1') being performed between the steps (a-1) and (a-2).

In the method, the step (b) may include: (b-1) etching the laminate composed of the solid electrolyte layer, the lithium layer, and the protective layer into a bridge-shaped structure when viewed from above the protective layer, using a focused ion beam apparatus; (b-2) etching off one end of left and right ends of the bridge-shaped pattern and etching off a lower portion of the bridge-shaped pattern; (b-3) bonding a probe to the surface of the protective layer of the bridge-shaped pattern from which the left or right end and the lower portion are etched; and (b-4) etching off the non-etched remaining end of the left and right ends of the bridge-shaped pattern, thereby obtaining the lithium-ion supply electrode including the protective layer, the lithium layer, and the solid electrolyte layer and bonded to the probe.

The method may further include: (c) bonding the protective layer and lithium layer of the lithium-ion supply electrode to a metal tip but not bonding a portion or the entity of the solid electrolyte layer to the metal tip; and (d) etching the solid electrolyte layer such that a cross-sectional area of the solid electrolyte layer parallel to the lithium layer decreases with an increasing distance from the lithium layer, the steps (c) and (d) being performed after the step (b-4).

The method may further include: (c') causing the lithium ion supply electrode bonded to the probe to approach a metal tip and rotating the probe so that the surface of the protective layer, the surface of the lithium layer, and the surface of the solid electrolyte layer of the laminate bonded to the probe face the metal tip, the step (c') being performed before the step (c).

A further aspect of the present disclosure, there is provided a method of analyzing a lithium secondary battery material in real-time, the method including: (1) loading the lithium-ion supply electrode into a first holder of a real-time biasing holder; (2) loading a material used for a lithium secondary battery into a second holder; and (3) bringing the solid electrolyte of the lithium-ion supply electrode into contact with the material and applying a voltage or a current to the lithium-ion supply electrode and the material to analyze changes in structure and interface of the material in real-time, using a microscope during a charging or discharging process.

In addition, the material used for the lithium secondary battery may be any one material selected from the group consisting of a negative electrode material, an electrolyte, a positive electrode material, and a current collector.

In addition, the microscope may be any one selected from the group consisting of a transmission electron microscope (TEM), a scanning electron microscope (SEM), an optical microscope (OM), and a scanning probe microscope (SPM).

The lithium-ion supply electrode of the present disclosure is used for real-time analysis of a lithium secondary battery material in a charging and discharging environment. To this end, the lithium-ion supply electrode uses a solid electrolyte with high lithium-ion conductivity. In addition, the lithium-ion supply electrode of the present disclosure has an effect of preserving the amount of lithium by preventing lithium oxidation while the electrode is being loaded into a holder.

In addition, since the lithium-ion supply electrode of the present disclosure has an advantage of preventing lithium oxidation for a short time, a glove box is not required. Therefore, the lithium-ion supply electrode of the present disclosure can be used for the analysis of structural change and the interfacial response of lithium secondary battery materials using equipment sensitive to light and vibration, such as a transmission electron microscope.

BRIEF DESCRIPTION OF THE DRAWINGS

Since the accompanying drawings are for reference in describing exemplary embodiments of the present disclosure, the technical spirit of the present should not be construed as being limited to the accompanying drawings, in which:

FIGS. 5A to 5D are diagrams illustrating a process of loading a lithium-ion supply electrode prepared and a working electrode (current collector material) in a real-time biasing holder for plating reaction analysis of a lithium secondary battery current collector according to Example 2;

DESCRIPTION OF THE PREFERRED EMBODIMENTS

Herein after, examples of the present invention will be described in detail with reference to the accompanying drawings in such a manner that the ordinarily skilled in the art can easily implement the present invention.

The description given below is not intended to limit the present invention to specific embodiments. In relation to describing the present invention, when the detailed description of the relevant known technology is determined to unnecessarily obscure the gist of the present invention, the detailed description may be omitted.

The terminology used herein is for the purpose of describing particular embodiments only and is not intended to limit the scope of the present invention. As used herein, the singular forms "a", "an", and "the" are intended to include the plural forms as well unless the context clearly indicates otherwise. It will be further understood that the terms "comprise" or "have" when used in this specification specify the presence of stated features, integers, steps, operations, elements and/or combinations thereof, but do not preclude the presence or addition of one or more other features, integers, steps, operations, elements, and/or combinations thereof.

Terms including ordinal numbers used in the specification, "first", "second", etc. can be used to discriminate one component from another component, but the order or priority of the components is not limited by the terms unless specifically stated. These terms are used only for the purpose of distinguishing a component from another component. For example, without departing from the scope of the present invention, a first component may be referred as a second component, and a second component may be also referred to as a first component.

In addition, when it is mentioned that a component is "formed" or "stacked" on another component, it should be understood such that one component may be directly attached to or directly stacked on the front surface or one surface of the other component, or an additional component may be disposed between them.

Hereinafter, a lithium-ion supply electrode for real-time microscopic analysis and a method of manufacturing the same will be described in detail. However, those are described as examples, and the present invention is not limited thereto and is only defined by the scope of the appended claims.

Figure 1:
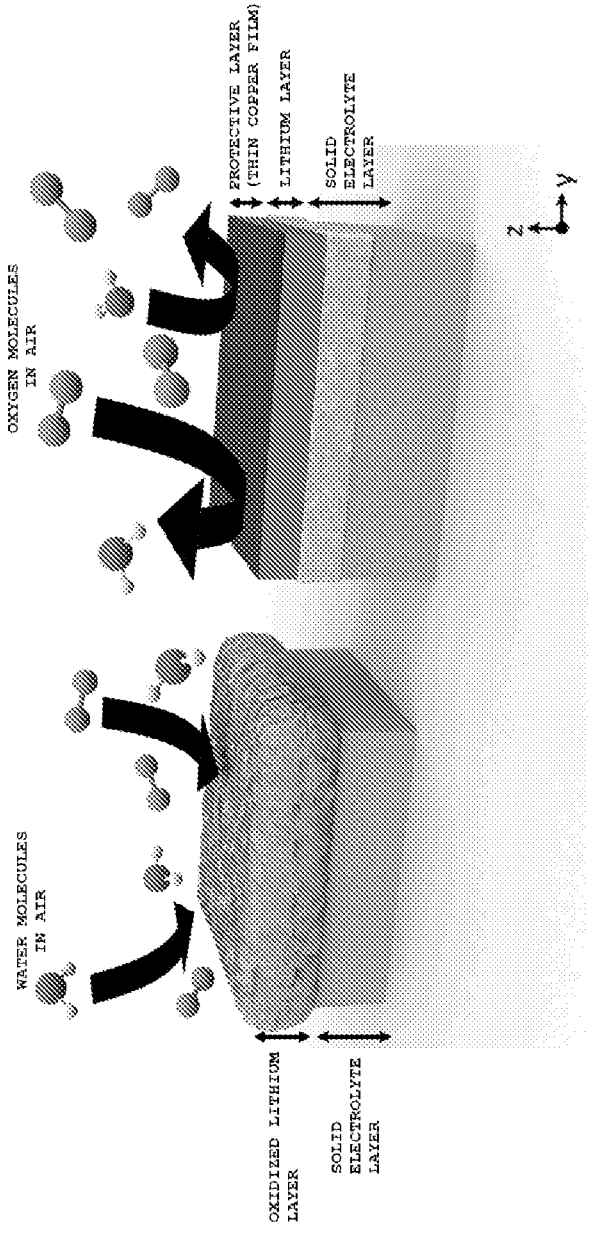
FIG. 1 is a schematic diagram illustrating a laminate with a protective layer according to one embodiment of the present disclosure and a laminate without a protective layer.

FIG. 1 is a schematic diagram illustrating a laminate with a protective layer according to one embodiment of the present disclosure and a laminate without a protective layer.

Reference to FIG. 1, the present disclosure provides a lithium-ion supply electrode including: a solid electrolyte layer including a solid electrolyte; a lithium layer formed on the solid electrolyte layer and including lithium; and a protective layer formed on the lithium layer and including a metal.

In addition, the thickness of the lithium layer may be in a range of 0.5 μm to 10 μm, preferably a range of 1 μm to 8 μm, and more preferably a range of 2 μm to 6 μm. When the thickness is smaller than 0.5 μm, not only lithium-ion is not sufficiently supplied, but a smooth interface is not formed between the solid electrolyte layer and the lithium layer and between the lithium layer and the protective layer.

Moreover, air can penetrate into an empty space and cause the oxidation of lithium. When the thickness is larger than 10 μm, etching is time-consuming since a lithium-ion supply electrode is manufactured using a focused ion beam apparatus. In addition, the larger the amount of etching, the more strain the focused ion beam apparatus. Therefore, a lithium layer thickness smaller than 0.5 μm or larger than 10 μm is not desirable.

The metal included in the protective layer may be one or more metals selected from the group consisting of copper (Cu), gold (Au), silver (Ag), and nickel (Ni).

In addition, the metal included in the protective layer may be copper (Cu).

In addition, the thickness of the protective layer may be in a range of 0.5 μm to 10 μm, preferably a range of 4 μm to 8 μm, and more preferably a range of 5 μm to 7 μm. When the thickness is smaller than 0.5 μm, it is difficult to handle with tweezers in the glove box, and it is not sufficient to protect the lithium metal from damage caused by the Ga ion beam in a focused ion beam apparatus. When the thickness is larger than 10 μm, etching is time-consuming when the lithium-ion supply electrode is manufactured using a focused ion beam apparatus. In addition, the larger the amount of etching, the more strain the focused ion beam apparatus. Therefore, the protective layer thickness smaller than 0.5 μm or larger than 10 μm is not desirable.

In addition, the cross-sectional area of the solid electrolyte layer that is parallel to the lithium layer decreases with increasing distance from the lithium layer.

In addition, the solid electrolyte layer may have any one shape selected from the group consisting of a circular cone shape, an elliptical cone shape, a flat plate, and a polypyramid shape.

In addition, the solid electrolyte may be one or more electrolytes selected from the group consisting of an oxide-based solid electrolyte, a sulfide-based solid electrolyte, a phosphide-based solid electrolyte, a silicide-based solid electrolyte, and combinations thereof.

In addition, the solid electrolyte layer may have a thickness of 0.5 μm to 85 mm. When the thickness is smaller than 0.5 μm, the solid electrolyte layer may be too thin to be etched in a focused ion apparatus. When the thickness is larger than 85 mm, it may be difficult to mount the solid electrolyte layer in a chamber of a focused ion apparatus. Therefore, the solid electrolyte layer thickness smaller than 0.5 μm or larger than 85 mm is not desirable.

In addition, the lithium-ion supply electrode may be used for the analysis of lithium secondary battery materials during charging or discharging of a lithium secondary battery, using at least one selected from the group consisting of a transmission electron microscope (TEM), a scanning electron microscope (SEM), an optical microscope (OM), and a scanning probe microscope (SPM). Preferably, the lithium-ion supply electrode may be used for the analysis of lithium secondary battery materials during charging and discharging of a lithium secondary battery, using a transmission electron microscope (TEM).

FIGS. 4A to 4I are images taken using a scanning electron microscope (SEM) in a focused ion beam apparatus, and the images illustrate the processes of manufacturing a lithium-ion supply electrode according to Example 1 using a focused ion beam apparatus.

Referring to FIGS. 4A to 4I, the present disclosure provides a method of manufacturing a lithium-ion supply electrode, the method comprising: (a) forming a liquid-phase lithium layer on a solid electrolyte layer under inert gas conditions and at a temperature of a melting point of lithium or above the melting point of lithium and forming a protective layer including a metal on the liquid-phase lithium layer, thereby preparing a laminate including the solid electrolyte layer, the lithium layer, and the protective layer; and (b) separating a portion of the laminate such that the separated portion has a predetermined shape, using a focused ion beam apparatus, at a temperature lower than the melting point of lithium, thereby producing a lithium-ion supply electrode including the solid electrolyte layer, the lithium layer, and the protective layer.

In addition, the step (a) may be performed at a temperature in a range of 180.5° C. to 500° C. and preferably a range of 200° C. to 300° C. When the temperature is lower than 180.5° C., the lithium does not change to a liquid state and thus the liquid lithium layer cannot be famed on the solid electrolyte layer. Therefore, the temperature lower than 180.5° C. is not desirable. When the temperature is higher than 500° C., it is not desirable because the temperature has a structural effect on the protective layer or the solid electrolyte layer.

In the method, the step may include: (a-1) wetting the solid electrolyte layer with liquid lithium to form a laminate of the solid electrolyte layer and the liquid-phase lithium layer; and (a-2) placing the protective layer including a metal on the liquid-phase lithium layer to prepare the laminate of the solid electrolyte layer, the lithium layer, and the protective layer.

The step (a) may further include (a-1') of adjusting the thickness of the liquid-phase lithium layer by adding liquid lithium to the liquid-phase lithium layer or removing some liquid lithium from the liquid-phase lithium layer at a temperature of a melting point of lithium or above the melting point of lithium, the step (a-1') being performed between the steps (a-1) and (a-2).

In the method, the step (b) may include: (b-1) etching the laminate composed of the solid electrolyte layer, the lithium layer, and the protective layer into a bridge-shaped structure when viewed from above the protective layer, using a focused ion beam apparatus; (b-2) etching off one end of left and right ends of the bridge-shaped pattern and etching off a lower portion of the bridge-shaped pattern; (b-3) bonding a probe to the surface of the protective layer of the bridge-shaped pattern from which the left or right end and the lower portion are etched; and (b-4) etching off a non-etched remaining end of the left and right ends of the bridge-shaped pattern, thereby obtaining the lithium-ion supply electrode including the protective layer, the lithium layer, and the solid electrolyte layer and bonded to the probe.

The method may further include: (c) bonding the protective layer and lithium layer of the lithium-ion supply electrode to a metal tip but not bonding a portion or the entity of the solid electrolyte layer to the metal tip; and (d) etching the solid electrolyte layer such that a cross-sectional area of the solid electrolyte layer parallel to the lithium layer decreases with an increasing distance from the lithium layer, the steps (c) and (d) being performed after the step (b-4).

The method may further include: (c') causing the lithium ion supply electrode bonded to the probe to approach a metal tip and rotating the probe so that the surface of the protective layer, the surface of the lithium layer, and the surface of the solid electrolyte layer of the laminate bonded to the probe face the metal tip, the step (c') being performed before step (c). Preferably, the surfaces of the protective layer, the lithium layer, and the solid electrolyte later may each face a top side of the metal tip.

The present disclosure provides a method of analyzing a lithium secondary battery material in real-time, the method comprising: (1) loading the lithium-ion supply electrode into a first holder of a real-time biasing holder; (2) loading a material used for a lithium secondary battery into a second holder; and (3) bringing the solid electrolyte of the lithium-ion supply electrode into contact with the material and applying a voltage or a current to the lithium-ion supply electrode and the material to analyze changes in structure and interface of the material in real-time, using a microscope during a charging or discharging process.

In addition, the material used for the lithium secondary battery may be any one material selected from the group consisting of a negative electrode material, an electrolyte, a positive electrode material, and a current collector.

In addition, the microscope may be any one selected from the group consisting of a transmission electron microscope (TEM), a scanning electron microscope (SEM), an optical microscope (OM), and a scanning probe microscope (SPM), and may preferably be a transmission electron microscope (TEM).

The lithium-ion supply electrode for real-time transmission electron microscope analysis must be manufactured to enable observation of structural defects and analysis of a defect generation mechanism by constructing a charging and discharging environment on a miniaturized scale. The lithium-ion supply electrode must contain lithium and an electrolyte to supply lithium-ions. During a period in which the lithium-ion supply electrode is loaded into the holder of the real-time transmission electron microscope, the lithium must not be oxidized but preserved.

To this end, three approaches are taken.

The first approach is to minimize the area of lithium exposed to air (see FIG. 1) to prevent oxidation of lithium by wetting the solid electrolyte with liquid lithium in a glove box and by covering the solid electrolyte wet with the liquid lithium with a thin copper film serving as the protective layer. Since the inside of the glove box is strictly controlled in water vapor partial pressure and oxygen partial pressure, lithium is not oxidized in the glove box. In this step, since the thin copper film overlying the lithium layer protects the lithium from the Ga ion beam while etching process is performed with a focused ion beam apparatus, the lithium-ion supply electrode can be fabricated without depositing an additional protective layer.

A second approach is to design a method of fabricating a lithium-ion supply electrode using a focused ion beam apparatus. The use of the focused ion beam apparatus simultaneously enables observation through scanning electron microscope, deposition of platinum (Pt), fine-scale etching, and observation using a Ga ion beam. Since the lithium-ion supply electrode according to the present disclosure has a size of about 15×8×20 $\mu m^3$, the lithium-ion supply electrode cannot be manufactured by human hands. However, with the use of a focused ion beam apparatus, it is possible to manufacture a micro-sized lithium-ion supply electrode and attach the manufactured electrode to a metal tip.

Figure 2A:
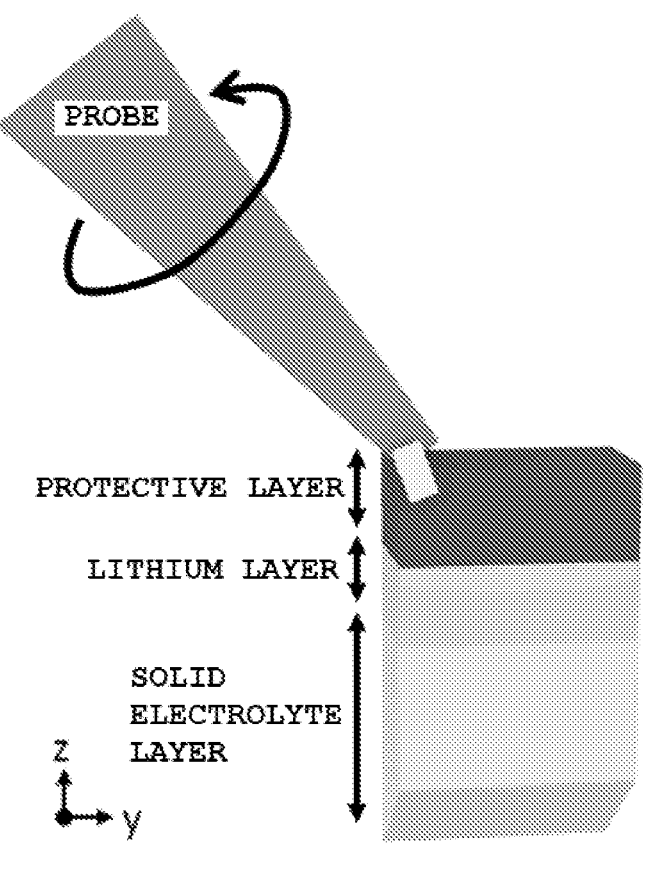
FIGS. 2A and 2B are schematic diagrams illustrating a lithium-ion supply electrode before and after 180° rotation of a probe in a focused ion beam apparatus, respectively when a lithium-ion supply electrode is manufactured by a manufacturing method according to one embodiment of the present disclosure.
Figure 2B:
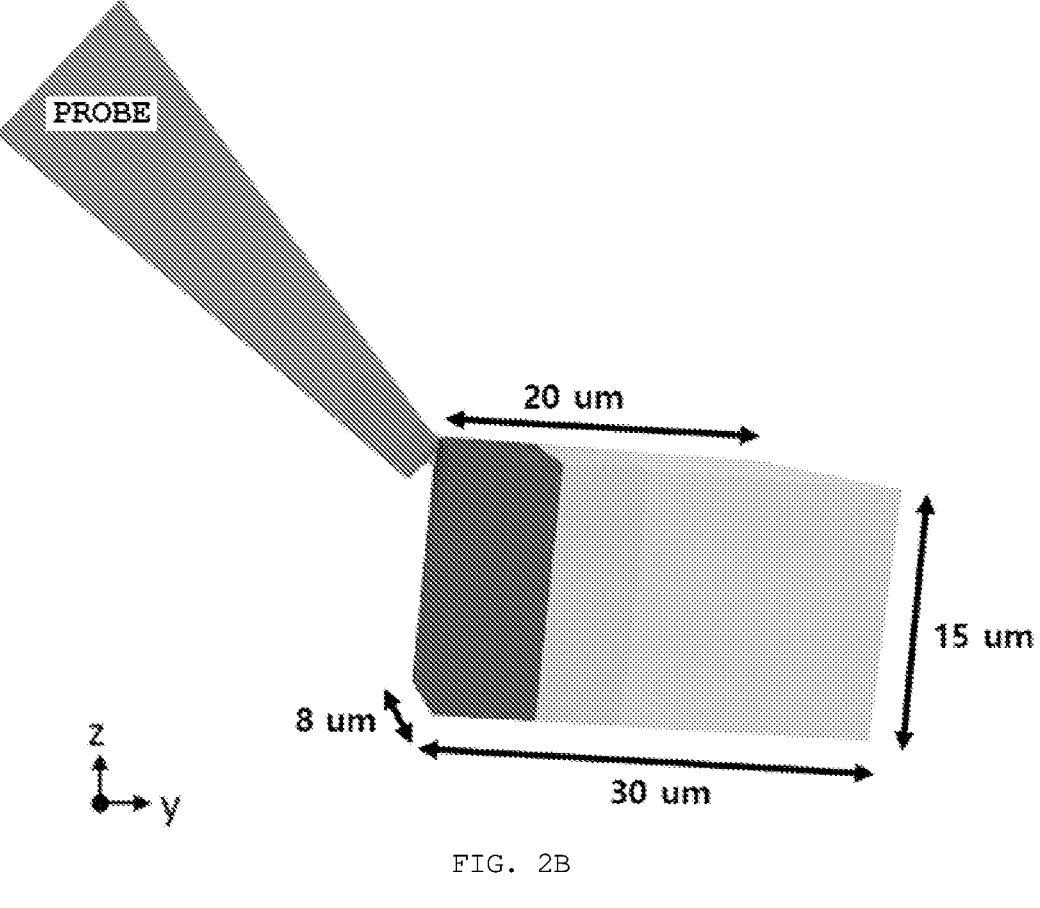

In the laminate composed of the solid electrolyte layer, the lithium layer, and the protective layer produced through the first approach, the protective layer to prevent oxidation of lithium is the top layer, and the solid electrolyte layer is the bottom layer. The thickness of the top layer is 6 $\mu m$, the thickness of the lithium layer directly underneath the top layer is about 5 $\mu m$, and the thickness of the solid electrolyte layer as the bottom layer is hundreds of $\mu m$ or more. Since the focused ion beam apparatus performs etching by emitting an ion beam that is first incident on the surface of the laminate and then permeates into the laminate. Therefore, the laminate must be mounted in the focused ion beam apparatus in a state in which the protective layer having a thickness of 6 μm faces up so that a sample including all of the solid electrolyte layer, the lithium layer, and the protective layer can be produced. (Conversely, when the laminate is mounted such that the solid electrolyte becomes the top layer, since the solid electrolyte has a thickness of hundreds of μm or more, it is difficult to etch the laminate.) When an electrode is separated from the laminate by using a focused ion beam apparatus, the protective layer is typically located on the top, and the lithium layer and the solid electrolyte layer are positioned in this order underneath the protective layer. However, when supplying lithium-ions to a lithium secondary battery material to be analyzed, the solid electrolyte layer capable of transporting lithium-ions must be located on the top so that the lithium secondary battery material comes into contact with the solid electrolyte layer. Therefore, to make the solid electrolyte layer to be mounted on the top, the manufacturing method includes a process of rotating the probe by an angle of 180° using a focused ion beam apparatus. The solid electrolyte is positioned on the bottom (FIG. 2A) before the rotation of the probe, but the solid electrolyte is positioned on the top after the 180° rotation of the probe (FIG. 2B). With this probe rotation method, it is possible to manufacture a lithium-ion supply electrode in which a solid electrolyte is disposed on the top.

The third approach is to control the thickness of the lithium layer to fall within a range of 0.5 μm to 10 μm during the application of the first approach. When the lithium layer is excessively thin (i.e., smaller than 0.5 μm), not only are the lithium-ions not sufficiently supplied, but a smooth interface is not formed between the solid electrolyte layer and the lithium layer and between the lithium layer and the protective layer. In addition, there is a risk of air penetrating into an empty space and oxidizing the lithium. On the other hand, when the thickness of the lithium layer exceeds 10 μm, it takes a long time to etch the lithium layer using the focused ion beam apparatus, and the more the etching amount, the more strain the focusing ion beam apparatus. Therefore, the thickness of the lithium layer was optimized to be within a range of 0.5 μm to 10 μm.

EXAMPLE

Hereinafter, a preferred example of the present invention will be described. However, the example is for illustrative purposes, and the scope of the present invention is not limited thereto.

Example 1: Manufacturing of Lithium-Ion Supply Electrode

The manufacturing of a laminate including a solid electrolyte layer, a lithium layer, and a protective layer was performed in a glove box in which the oxygen partial pressure and the water vapor partial pressure were strictly controlled. A lithium ribbon was melted using a hot plate heated to 260° C. to prepare liquid lithium. A surface of a pellet-shaped oxide-based solid electrolyte ($Li_7La_3Zr_2O_{12}$) was wet with the liquid lithium to form a liquid layer. Next, the wetting lithium was reduced two or three times so that the thickness of the lithium layer finally had a thickness of about 5 μm. A thin copper film with a thickness of 6 μm was placed on the lithium layer to form a laminate composed of the solid electrolyte layer, the lithium layer, and the protective layer. Next, the laminate was taken down from a hot plate, sufficiently cooled, and sealed. After that, the sealed laminate was taken out of the glove box.

The sealed laminate was then unsealed and placed in a focused ion beam apparatus. The focused ion beam apparatus performs deposition of platinum (Pt), fine-scale etching, and observation by using a Ga ion beam. At this stage, an additional tungsten tip (manufacturer name: Probes, product name: WNP-10, Tungsten nano probe) was mounted to be horizontally laid.

FIGS. 4A to 4I are images taken using a scanning electron microscope (SEM) in a focused ion beam apparatus, the images illustrate processes of manufacturing a lithium-ion supply electrode according to Example 1 using a focused ion beam apparatus. Specifically, the images were taken with a scanning electron microscope and inset images were taken with a focused ion beam apparatus.

Figure 4A:
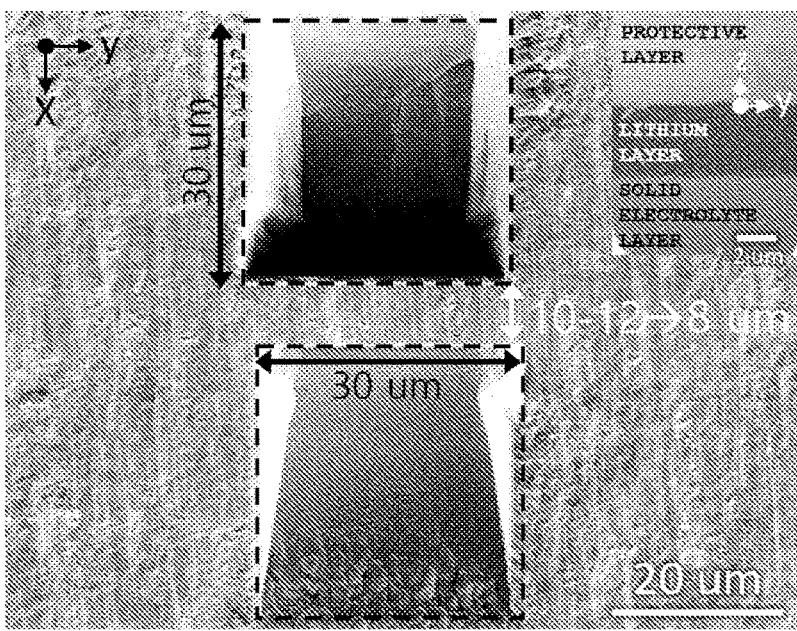
FIGS. 4A to 4I are images taken using a scanning electron microscope (SEM) in a focused ion beam apparatus, and the images illustrate processes used to manufacture a lithium-ion supply electrode according to Example 1 using a focused ion beam apparatus.

Referring to FIG. 4A, the laminate including the solid electrolyte layer, the lithium layer, and the protective layer was etched at both sides thereof to form a bridge-shaped pattern (when viewed in a z-axis direction) having a width in a range of 10 μm to 12 μm by using the Ga ion beam of a voltage of 30 kV and a current of 21 nA. The etched area in each side of the bridge pattern is 30×30×25 μm³. Next, it was checked whether an interface layer between the protective layer and the lithium layer and an interface layer between the lithium layer and the solid electrolyte layer were formed and whether the thickness of the lithium layer was adequate in an x-axis direction as shown in the inset using the focused ion apparatus. The etching surface is damaged when etching is performed with a high current. Therefore, with the application voltage of 30 kV fixed, the application current was first set to 9.3 nA and then gradually decreased to 2.5 nA during the etching so that a smooth and well-trimmed etched surface can be obtained. In this stage, the width of the bridge-shaped pattern was adjusted to about 8 μm.

Figure 4B:
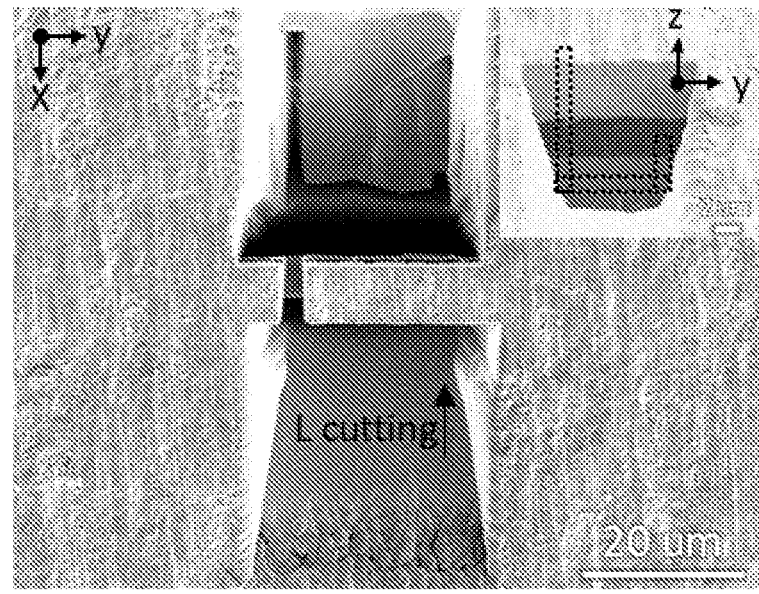

Referring to FIG. 4B, a beam was emitted in the x direction to the cross sections of the protective layer, the lithium layer, and the solid electrolyte layer. By this beam radiation, etching proceeded in an L-shaped direction (when viewed in the x direction). That is, one of the left and right ends of the bridge-shaped pattern was etched off, and a lower portion of the bridge-shaped pattern was etched off.

Figure 4C:
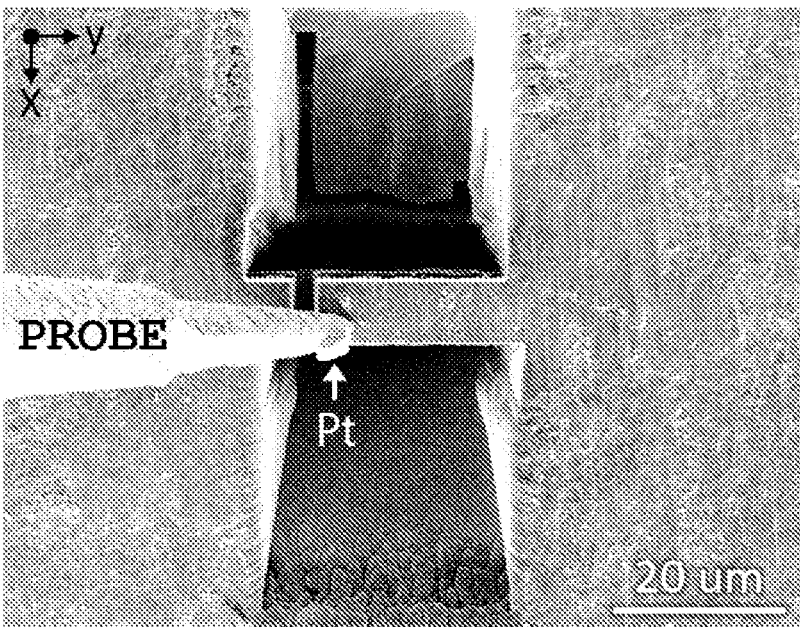

Next, referring to FIG. 4C, a probe was inserted and platinum (Pt) was deposited to bond the probe to the upper surface of the protective layer on the pattern from which one of the left and right ends and the lower portion were etched off.

Figure 4D:
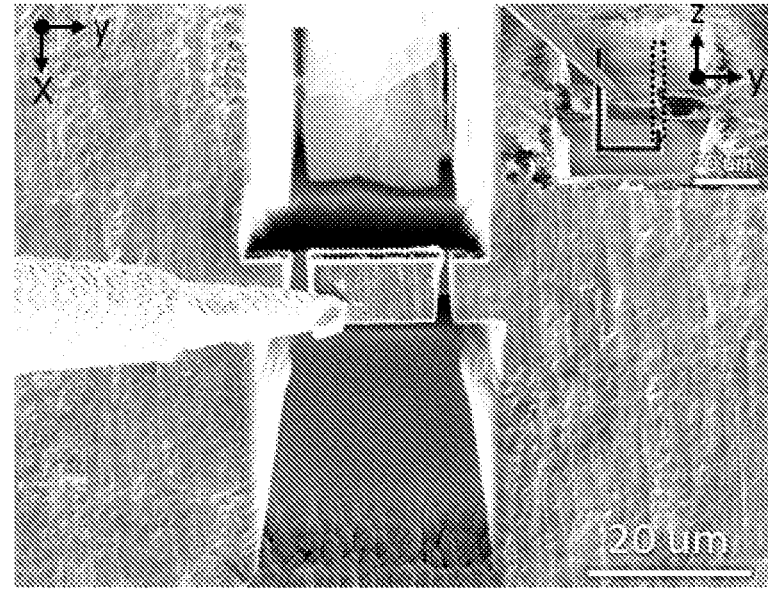

Referring to FIG. 4D, the remaining end of the left and right ends of the pattern was etched so that finally the L-shaped etched portion changed to form a U shape. Thus, a lithium-ion supply electrode including the protective layer, the lithium layer, and the solid electrolyte layer and bonded to the probe was manufactured.

Figure 4E:
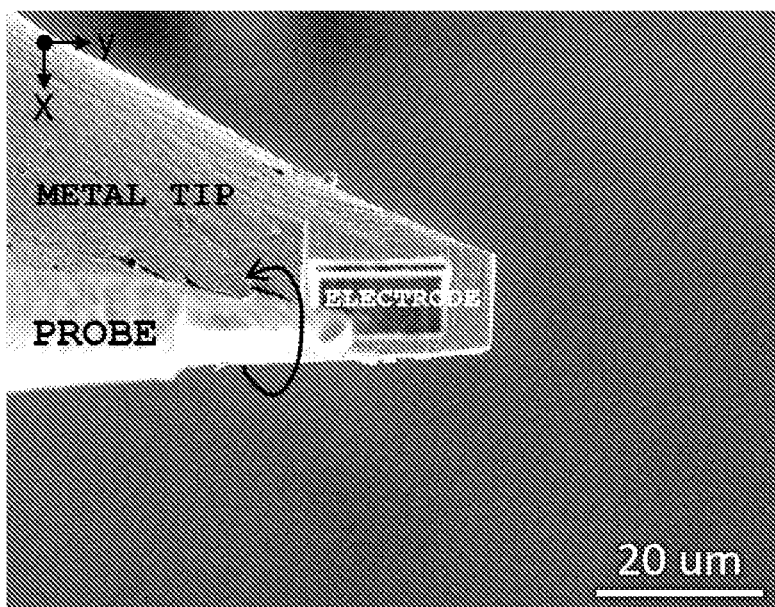
Figure 4F:
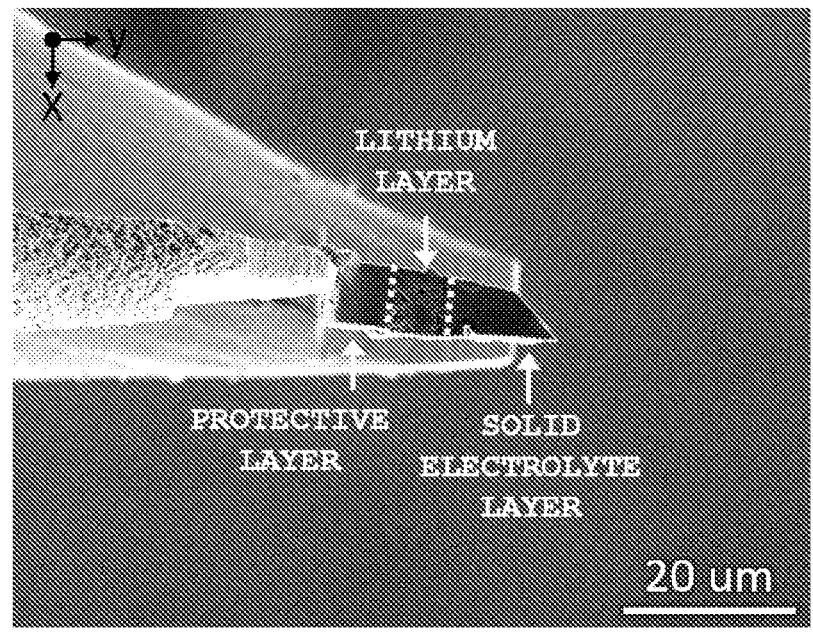

Since an end portion of the metal tip has a size of a few μm which is smaller than the lithium-ion supply electrode, the end portion of the metal tip is trimmed. Referring to FIG. 4E, the probe to which the lithium-ion supply electrode is inserted into the trimmed end portion of the metal tip, and then the probe is rotated 180° as illustrated in FIG. 4F. FIGS. 2A and 2B are schematic diagrams illustrating a lithium-ion supply electrode before and after 180° rotation of the probe, respectively in a focused ion beam apparatus. Referring to FIGS. 2A, 2B, and 4F, the protective layer, the lithium layer, and the solid electrolyte layer were arranged in this order from the top before the probe was rotated. However, when the probe was rotated by 180°, the positions of the protective layer, the lithium layer, and the solid electrolyte layer were changed such that the protective layer, the lithium layer, and the solid electrolyte layer were arranged in this order from the left side to the right side.

Figure 4G:
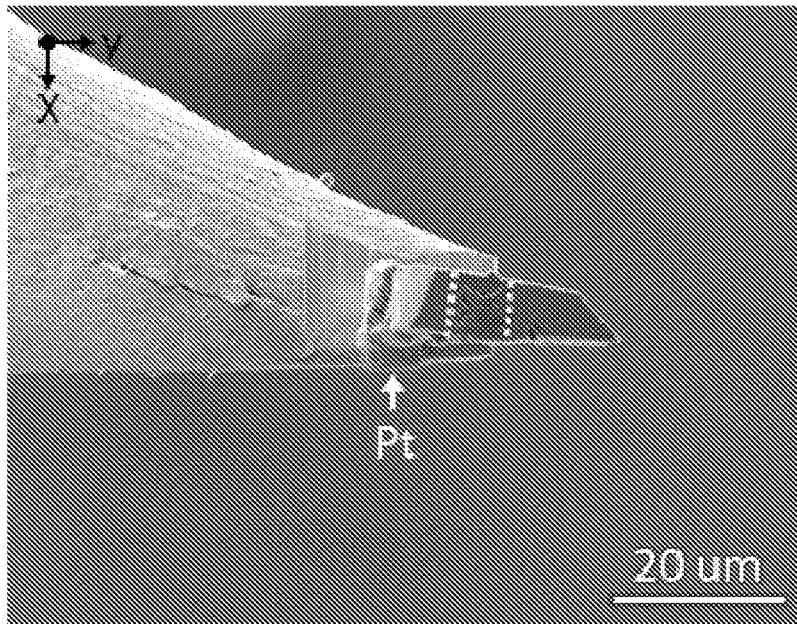

Referring to FIG. 4G, platinum was deposited to connect the protective layer and the lithium layer of the lithium-ion supply electrode to the end portion of the metal tip, and then the probe and the lithium-ion supply electrode were separated from each other by etching.

Figure 4H:
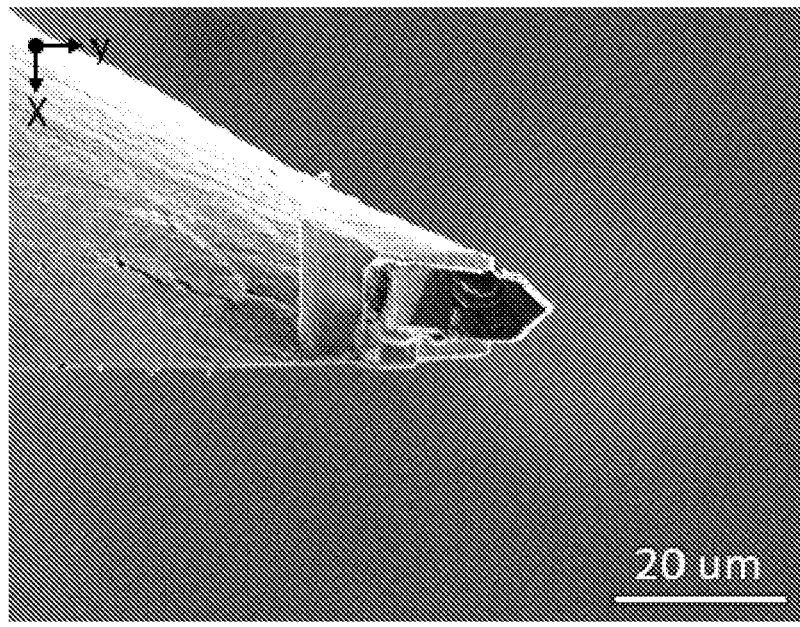
Figure 4I:
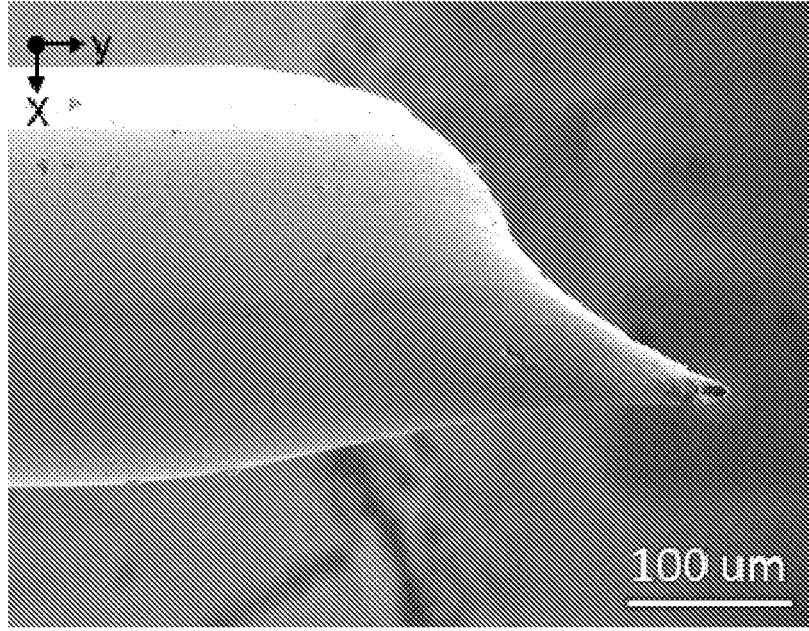

Since the sample size for transmission electron microscopy is several micrometers, the surface of the lithium-ion supply electrode needs to be processed to be sharp. Referring to FIGS. 4H and 4I, the lithium-ion supply electrode was processed to have a surface morphology of a carton of milk, using a focused ion beam apparatus.

Example 2: Analysis of Current Collector of Lithium Secondary Battery

In a real-time biasing holder, a lithium-ion supply electrode manufactured according to Example 1 was loaded into a first holder, a working electrode made of a current collector material was loaded into a second holder, and a solid electrolyte layer of the lithium-ion supply electrode was brought into contact with the working electrode to form a half cell composed of a counter electrode (lithium layer of the lithium-ion supply electrode), an electrolyte (solid electrolyte layer of the lithium-ion supply electrode), and the working electrode (current collector material) arranged in this order.

In this case, as the working electrode, three different types were prepared: lithiophobic Cu, lithiophobic Ni, and lithiophobic Ni coated with lithiophilic Ag.

Here, the lithiophobic material refers to a material which is not easily plated with pure lithium, and the lithiophilic material refers to a material which is easily plated with pure lithium.

Next, while the contacted half-cell is charged and discharged, the half-cell is imaged in real-time with a transmission electron microscope.

Comparative Example 1: Manufacturing of Lithium-Ion Supply Electrode without the Protective Layer A lithium-ion supply electrode was manufactured in the same manner as in Example 1 except that a thin copper film with a thickness of 6 μm was not placed on a lithium layer.

EXPERIMENTAL EXAMPLE

Experimental Example 1: Evaluation of Antioxidation Effect of Lithium Protective Layer FIGS. 3A to 3F are images taken using a scanning electron microscope (SEM) in a focused ion beam apparatus, the images illustrating the degree of oxidation of lithium in each of laminates prepared according to Example 1 and Comparative Example 1.

Figure 3A:
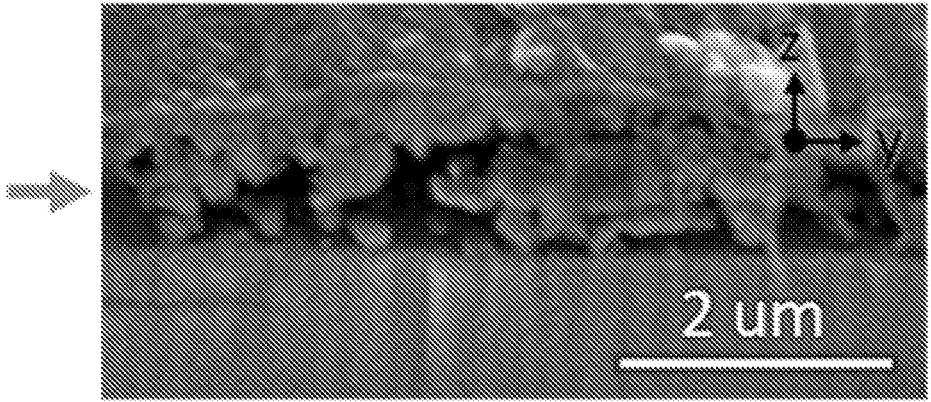
FIGS. 3A to 3F are images taken using a scanning electron microscope (SEM) in a focused ion beam apparatus, the images illustrating the degree of oxidation of lithium in each of the laminates prepared according to Example 1 and Comparative Example 1.

FIG. 3A is an SEM image of a cross-section of a laminate of a solid electrolyte layer and a lithium layer according to Comparative Example 1. Specifically, FIG. 3A is an SEM image taken after the solid electrolyte layer/lithium layer laminate prepared according to Comparative Example 1 is mounted on a focused ion beam apparatus. During the mounting of the laminate on the focused ion beam apparatus, the laminate was exposed to air for a period of 5 minutes or less. According to FIG. 3A, since a protective layer (thin metal film) was not present, lithium was oxidized, so that an interface layer between the lithium layer and the solid electrolyte layer was not even.

Figure 3B:
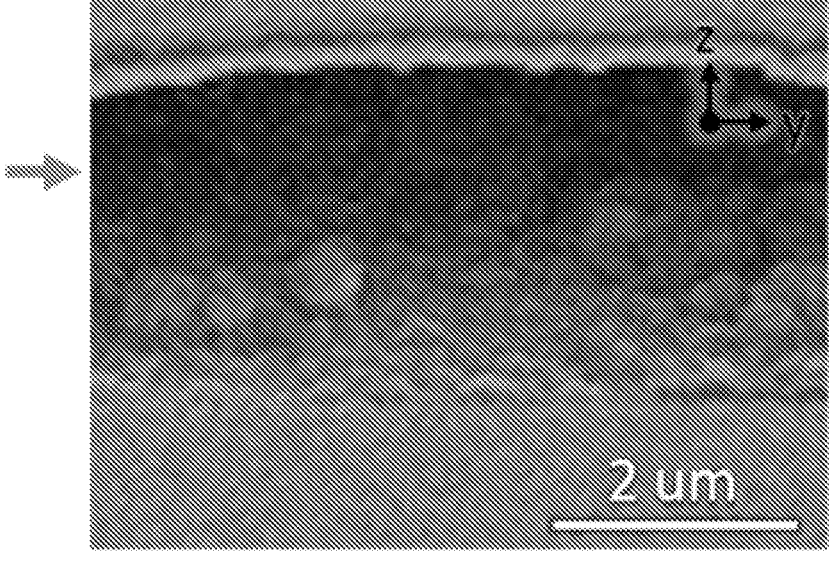

FIG. 3B is an SEM image of a cross-section of a structure in which platinum (Pt) is deposited on a surface of the solid electrolyte layer/lithium layer laminate of Comparative Example 1. In this case, the deposited platinum was formed as a protective layer to protect a sample from a Ga ion beam. Referring to FIG. 3B, since the laminate of Comparative Example was not provided with a protective layer, lithium was damaged while deposition process, and an empty space was formed in the interface between the lithium oxide layer and the deposited platinum layer.

Figure 3C:
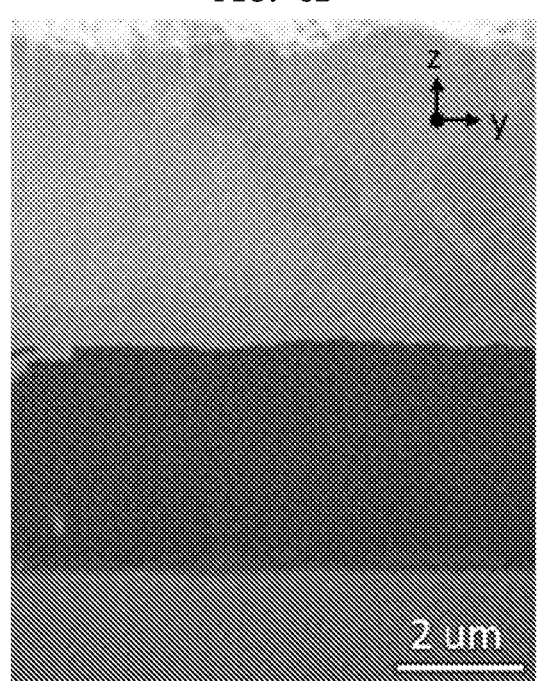

FIG. 3C is an SEM image of a cross-section of a solid electrolyte layer/lithium layer/protective layer laminate at the time of manufacturing the lithium-ion supply electrode according to Example 1. Referring to FIG. 3C, in the case of Example 1, a lithium oxide layer is not famed because lithium in the lithium layer is not oxidized. Thus, it was confirmed that a smooth interface is famed between the lithium layer and the solid electrolyte layer.

Figure 3D:
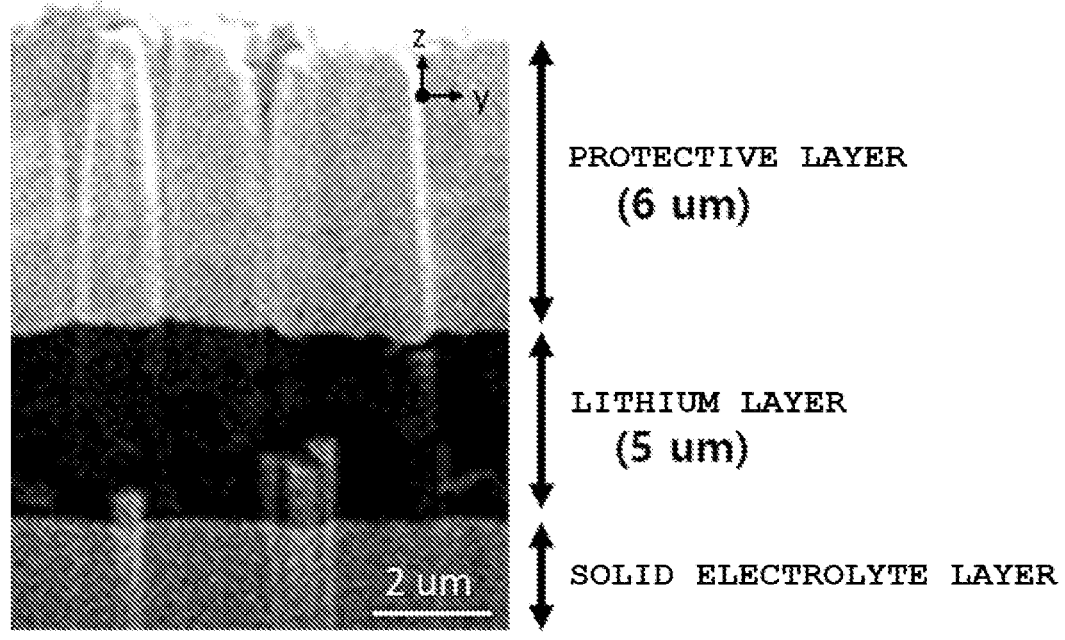

FIG. 3D is an SEM image of a cross-section taken after the solid electrolyte layer/lithium layer/protective layer laminate of Example 1 was stored in a vacuum desiccator for 7 days. Referring to FIG. 3D, it was confirmed that the laminate of Example 1 still maintains a smooth interface without lithium oxidation even after the 7 days of storage.

That is, in the case where the protective layer as a shield was not famed, lithium was oxidized even in a brief period as short as 5 minutes or less during which the laminate was loaded in the focused ion beam apparatus. However, in the case where the protective layer was formed, lithium was not oxidized even during 7 days of storage in a vacuum desiccator.

Figure 3E:
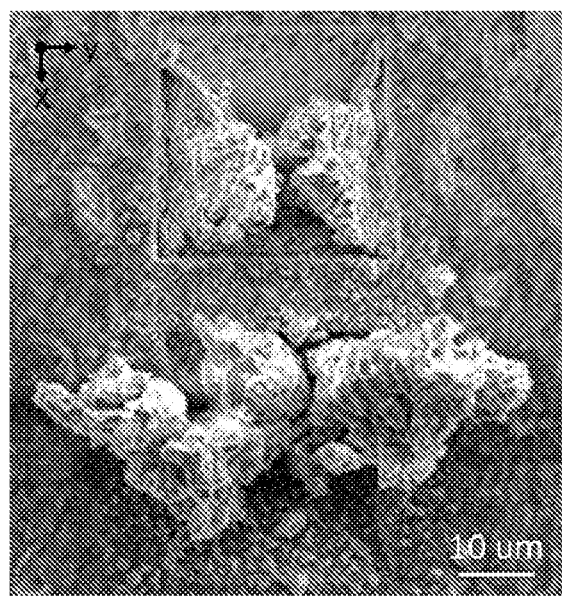

FIG. 3E illustrates the results of observing the solid electrolyte layer/lithium layer/protective layer laminate of Example 1 using a focused ion beam apparatus after the laminate was etched into a bridge-shaped pattern using a focused ion beam apparatus and then the etched pattern was exposed to air for 7 days. Referring to FIG. 3E, it was confirmed that lithium exposed air due to the etching was oxidized and thus the volume of the lithium layer increased. That is, even though the protective layer is formed, the lithium oxidation occurred if the lithium layer is exposed to air for a long time.

Figure 3F:
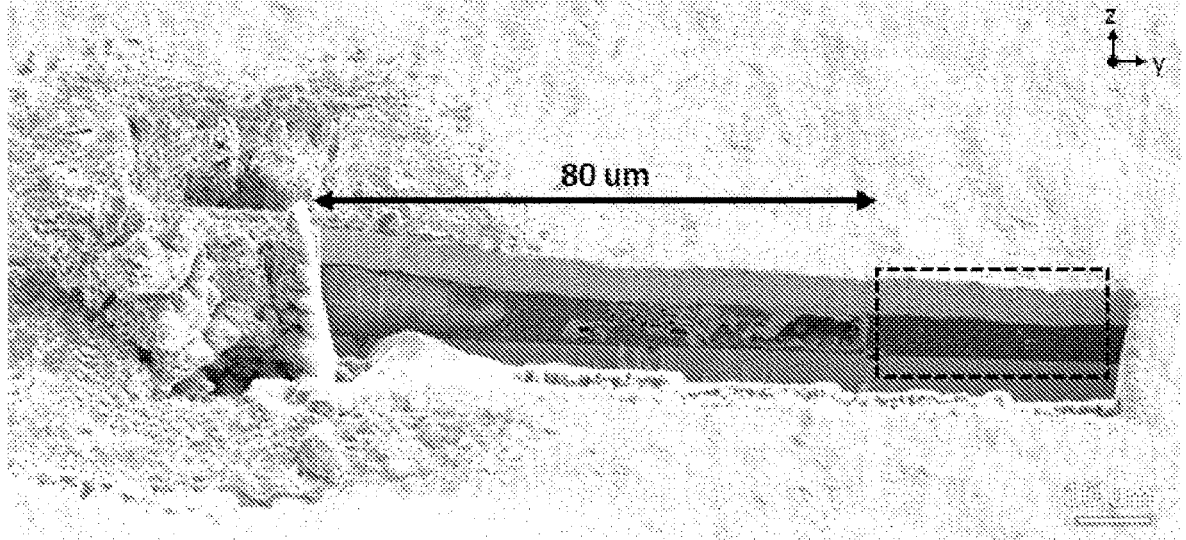

FIG. 3F is a view illustrating the result of observing an interface around an area exposed to air, of the structure of FIG. 3E. Referring to FIG. 3F, it was confirmed that the lithium layer was oxidized down to a depth of 80 μm from the exposed spot on the basis of the facts that the volume of the lithium layer increased and pores were formed. On the other hand, a region of a dotted square in FIG. 3F is spaced by 80 μm or more from the exposed spot. Therefore, the dotted square region was not oxidized.

Therefore, in the case of forming the protective layer as in the laminate of Example 1, if the lithium-ion supply electrode is manufactured in a region distanced by 80 μm from an air exposed spot, although the lithium layer is exposed to air, lithium-ion supply electrodes free of lithium oxidation can be obtained.

Experimental Example 2: Evaluation of Performance of Lithium-Ion Supply Electrode FIGS. 5A to 5D are diagrams illustrating a process of loading a lithium-ion supply electrode prepared and a working electrode (current collector material) in a real-time biasing holder for plating reaction analysis of a lithium secondary battery current collector according to Example 2. On the basis of the results of plating reaction analysis of the working electrode, it is possible to evaluate whether the lithium-ion supply electrode according to the present disclosure normally operates.

Figure 5B:
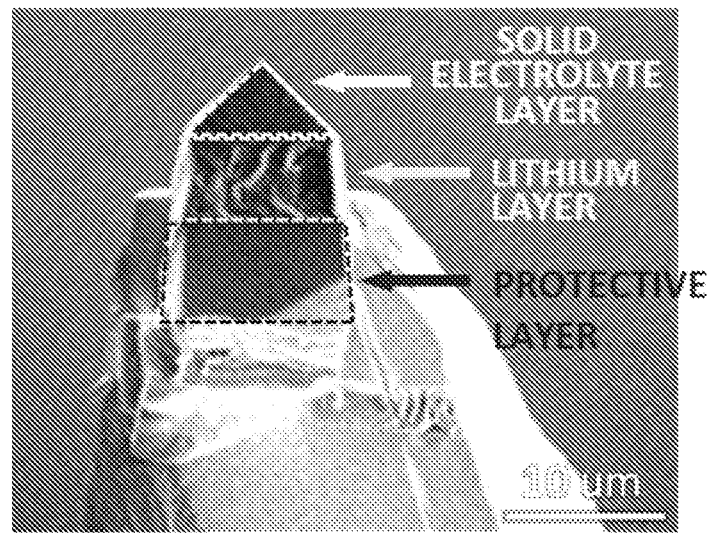
Figure 5C:
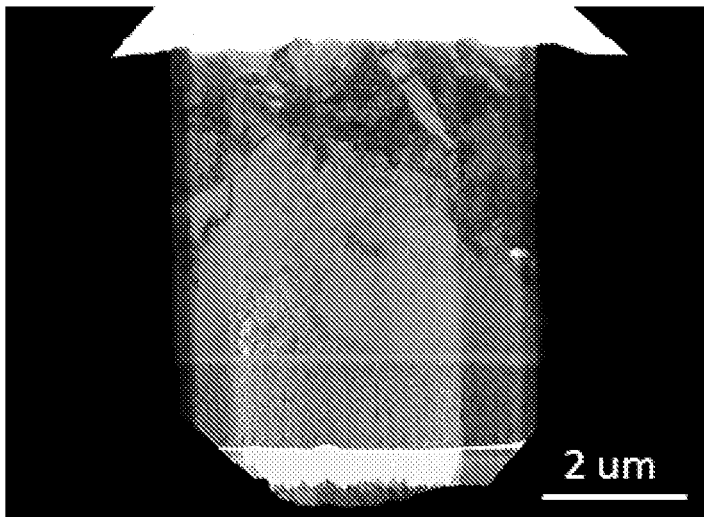
Figure 5D:
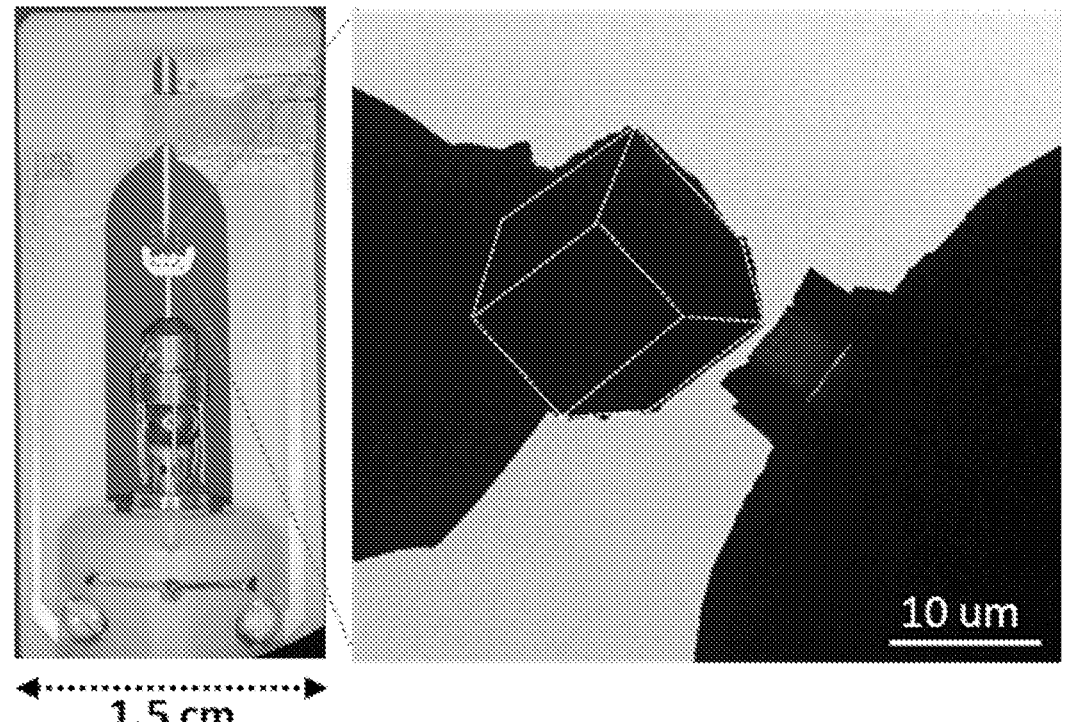

FIG. 5A is a schematic diagram illustrating an analysis experiment for a current collector of a lithium secondary battery according to Example 2, FIG. 5B is an image of a lithium-ion supply electrode according to Example 1, and FIG. 5C is a diagram illustrating a state in which the working electrode of Example 2 is made of lithiophobic Cu. FIG. 5D is an image of a real-time biasing holder when the lithium-ion supply electrode and the working electrode (lithiophobic Cu) prepared according to Example 1 are loaded for the current collector analysis experiment of the lithium secondary battery according to Example 2, and a low magnification TEM image of the biasing holder mounted on a transmission electron microscope.

Figure 6A:
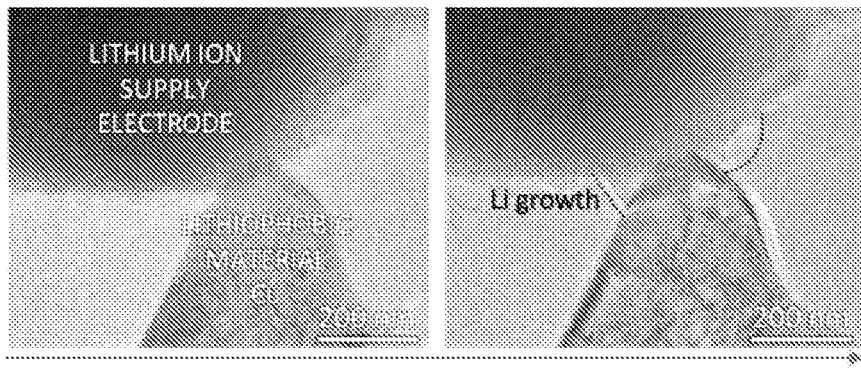
FIGS. 6A and 6B are views illustrating the experimental results of Example 2 when lithiophobic Cu is used as a working electrode.
Figure 6A:
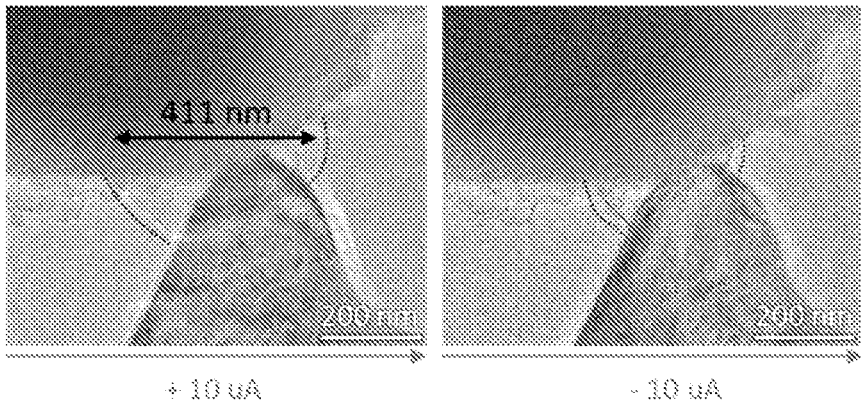
Figure 6B:
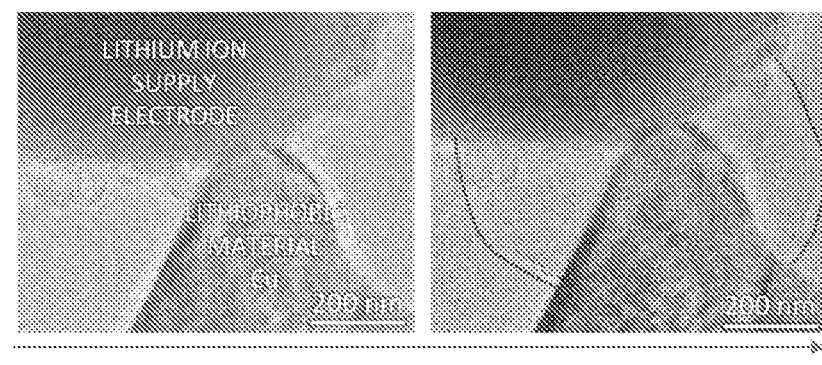
Figure 6B:
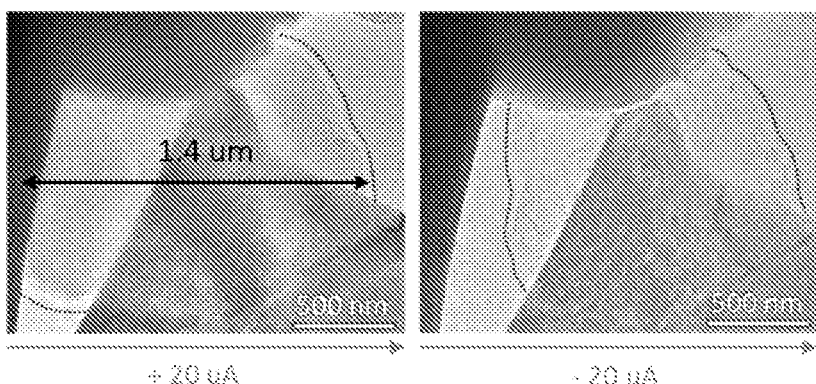

FIGS. 6A and 6B are views illustrating the experimental results of Example 2 when lithiophobic Cu is used as a working electrode. Specifically, FIG. 6A is a TEM image of an interface between a lithiophobic Cu electrode and the lithium-ion supply electrode of Example 1 in an environment in which a constant current of +10 uA or −10 uA is applied, and FIG. 6B is a TEM image of an interface between the lithiophobic Cu electrode and the lithium-ion supply electrode of Example 1 in an environment in which a constant current of +20 uA or −20 uA is applied.

Referring to FIGS. 6A and 6B, when a positive-direction current of +10 uA or +20 uA is applied, a plating reaction occurs in an interface between the lithium-ion supply electrode and the working electrode (Cu, lithiophobic material), and lithium particles grow. The lithium particles grow larger at a relatively high current of +20 uA. When a negative-direction current of −10 uA or −20 uA is applied, lithium-ions move from the interface to the lithium-ion supply electrode, so that the sizes of the lithium particles decrease.

Figure 7A:
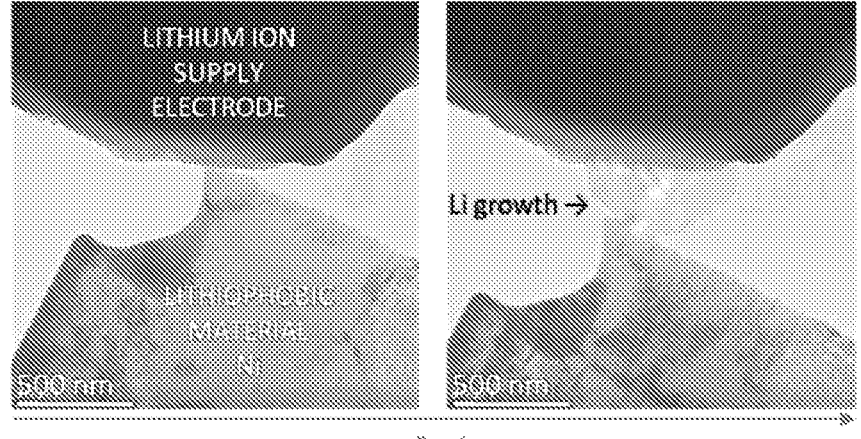
FIGS. 7A to 7B are views illustrating the experimental results of Example 2 when lithiophobic Ni is used as a working electrode.
Figure 7A:
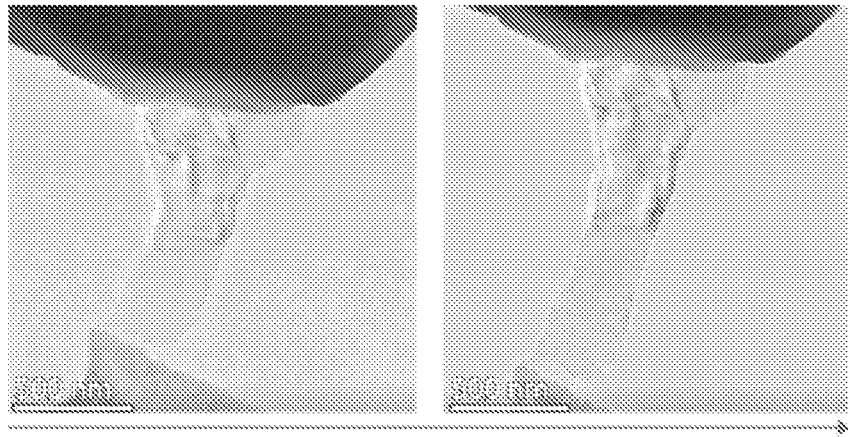
Figure 7B:
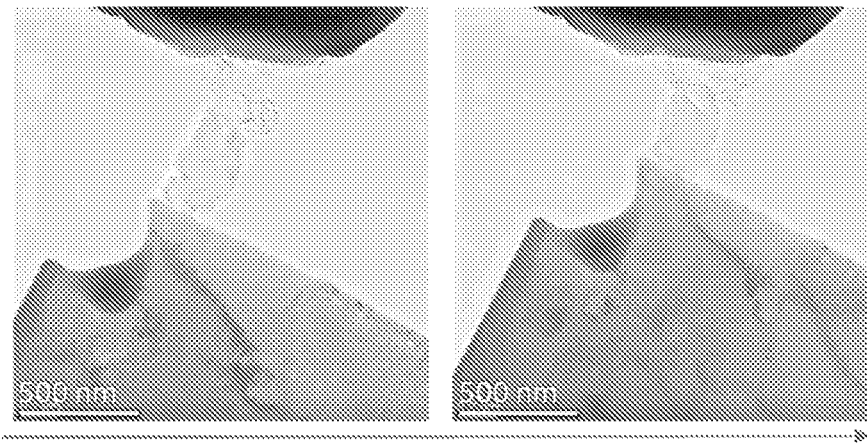
Figure 7B:
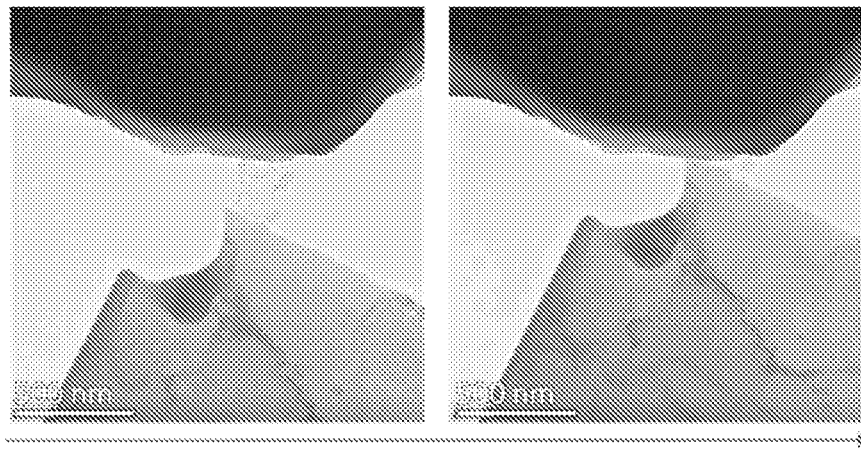

FIGS. 7A to 7B are views illustrating the experimental results of Example 2 when a lithiophobic Ni electrode is used as a working electrode. Specifically, FIG. 7A is a TEM image of an interface between the working electrode (lithiophobic Ni) and the lithium-ion supply electrode of Example 1 in an environment in which a constant current of +8 pA is applied, and FIG. 7B is a TEM image of an interface between the working electrode (lithiophobic Ni) and the lithium-ion supply electrode of Example 1 in an environment in which a constant current of −8 pA is applied.

Referring to FIG. 7A, when a current of +8 pA is applied, a plating reaction occurs at the interface between the lithium-ion supply electrode and the working electrode (Ni, lithiophobic material), and the lithium particles change into dendrites.

Referring to FIG. 7B, when a current of −8 pA is applied, lithium-ions move toward the lithium-ion supply electrode, and thus the size of the lithium grown at the interface decreases.

FIGS. 8A to 8D are views illustrating the experimental results of Example 2 when lithiophobic Ni coated with lithiophilic Ag is used as a working electrode.

Figure 8A:
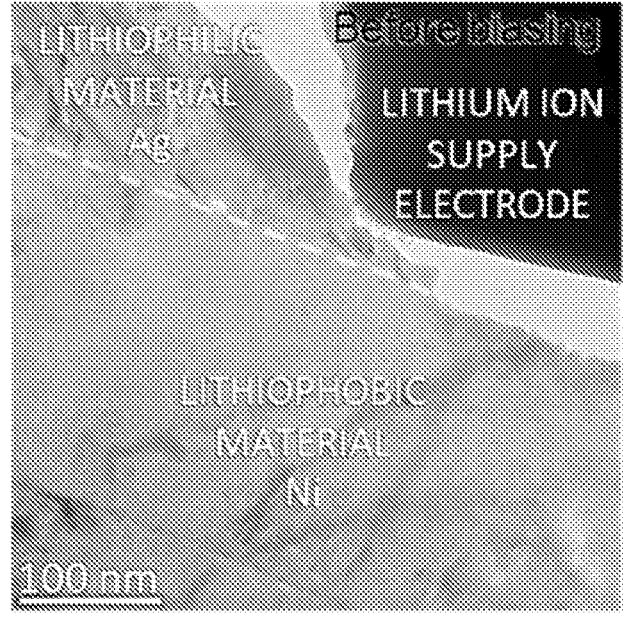
FIGS. 8A to 8D are views illustrating the experimental results of Example 2 when lithiophobic Ni coated with lithiophilic Ag is used as a working electrode.
Figure 8B:
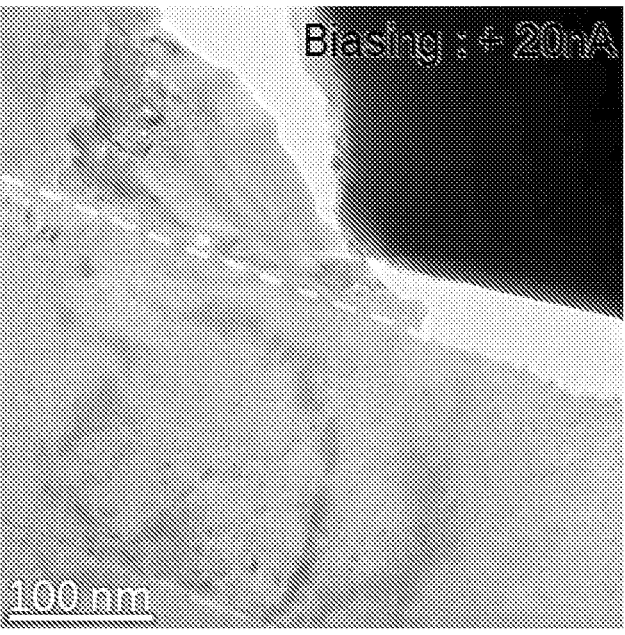

Specifically, FIG. 8A is a low-magnification TEM image of an interface between a working electrode (lithiophobic Ni coated with lithiophilic Ag) and the lithium-ion supply electrode of Example 1 in a state in which charging and discharging are not performed, and FIG. 8B is a low-magnification TEM image of an interface between a working electrode (lithiophobic Ni coated with lithiophilic Ag) and the lithium-ion supply electrode of Example 1 in an environment in which a +20 nA constant current is applied.

Figure 8C:
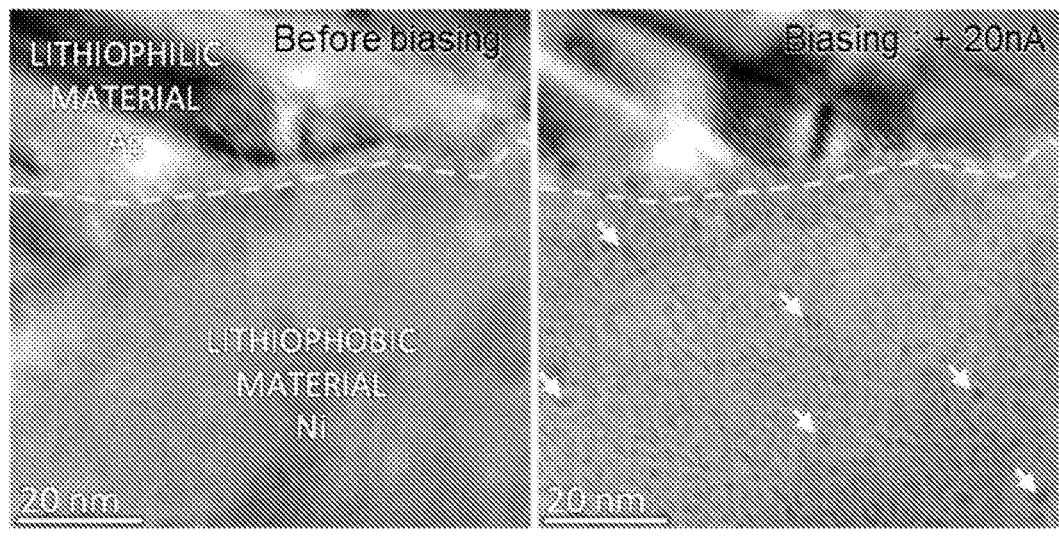
Figure 8C:
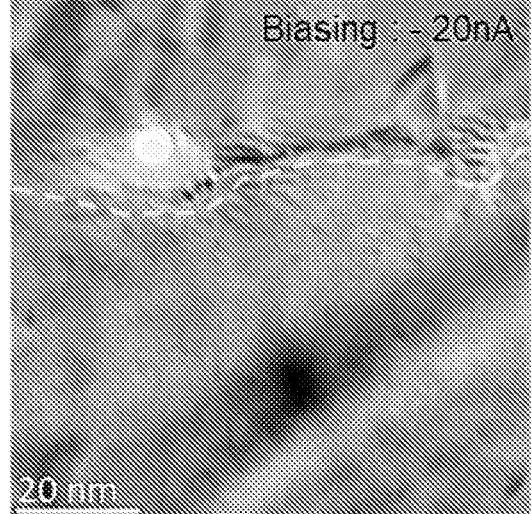

FIG. 8C illustrates high-magnification TEM images of an interface between the lithiophobic Ni and lithiophilic Ag of the working electrode in Example 1, the images being taken under conditions of pre-biasing, a constant current of +20 nA (biasing), and a constant current of −20 nA (biasing), respectively.

Figure 8D:
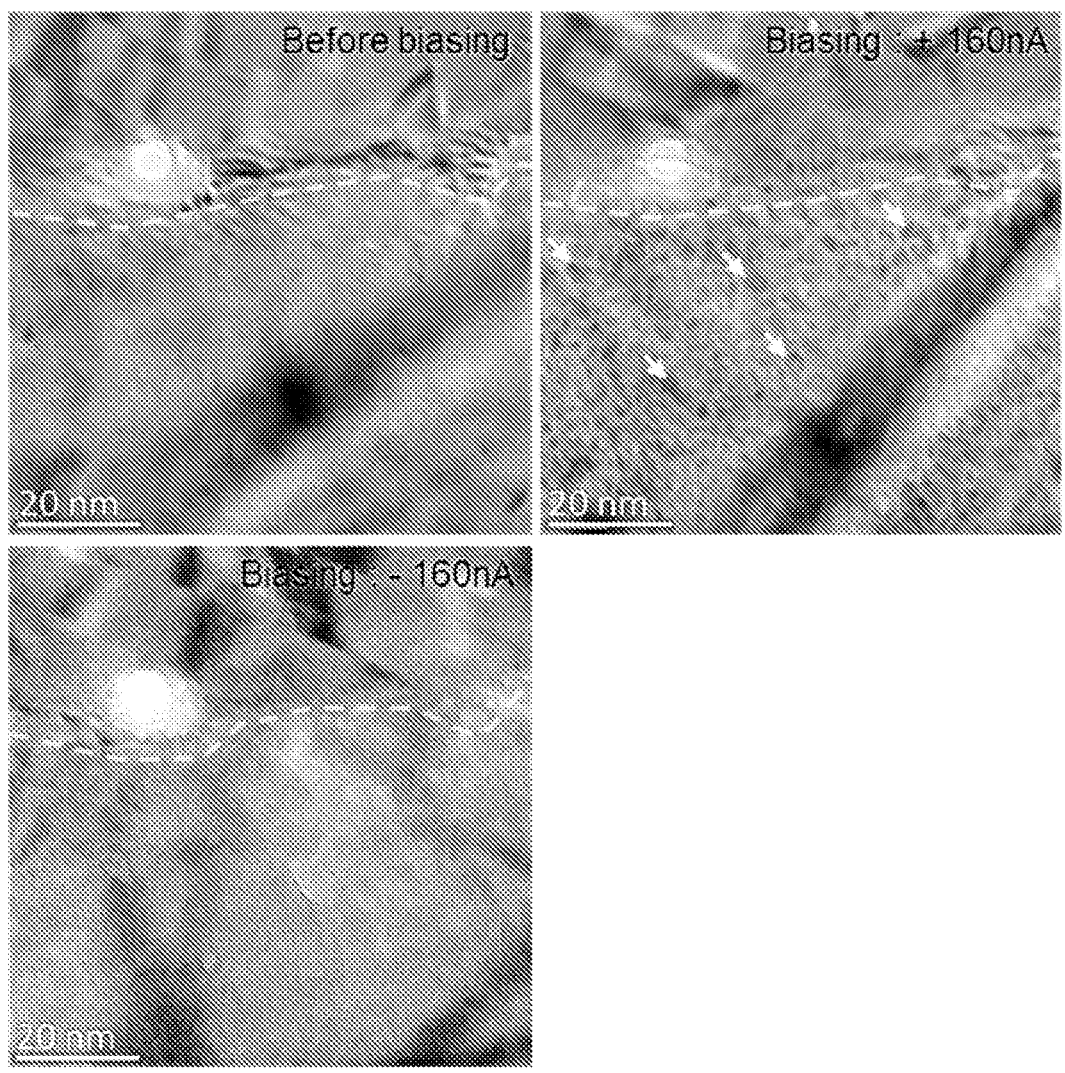

FIG. 8D illustrates high-magnification TEM images of an interface between the lithiophobic Ni and lithiophilic Ag of working electrode in Example 1, the images being taken under conditions of pre-biasing, a constant current of +160 nA (biasing), and a constant current of −160 nA (biasing), respectively.

Referring to FIG. 8A, in the working electrode, the lithiophilic Ag coating layer has a thickness in a range of 150 nm to 200 nm and is formed on a lithiophobic material, Ni.

Referring to FIG. 8B, in a low-magnification observation environment, it is found that no lithium particles are present in the interface between the lithium-ion supply electrode and the working electrode (lithiophobic Ni coated with lithiophilic Ag), and an insignificant change occurs in the interface while a current of +20 nA is applied.

On the other hand, referring to FIG. 8C, at an application current of +20 nA or in a high-magnification observation environment, a black pattern indicated by a white arrow appears in the +20 nA constant current environment (biasing: +20 nA) and disappears in the −20 nA constant current environment (biasing: −20 nA).

In addition, referring to FIG. 8D, in a relatively high current environment (biasing: +160 nA) compared to FIG. 8C, the size of the black pattern is larger than that of FIG. 8C. This change shows that the lithiophilic material coating (Ag) causes lithiation and delithiation of the lithiophobic material (Ni).

That is, when the lithium-ion supply electrode according to the present disclosure is used, it is possible to observe not only the lithium plating process but also the lithiation/delithiation reactions of a lithiophobic material.

Therefore, when the lithium-ion supply electrode according to the present disclosure is used, it is possible to observe the lithium growth morphology in various micro current and voltage environments and to analyze changes in the structure and interface of various lithiophobic/lithiophilic materials of a secondary battery material in real-time.

Figure 9A:
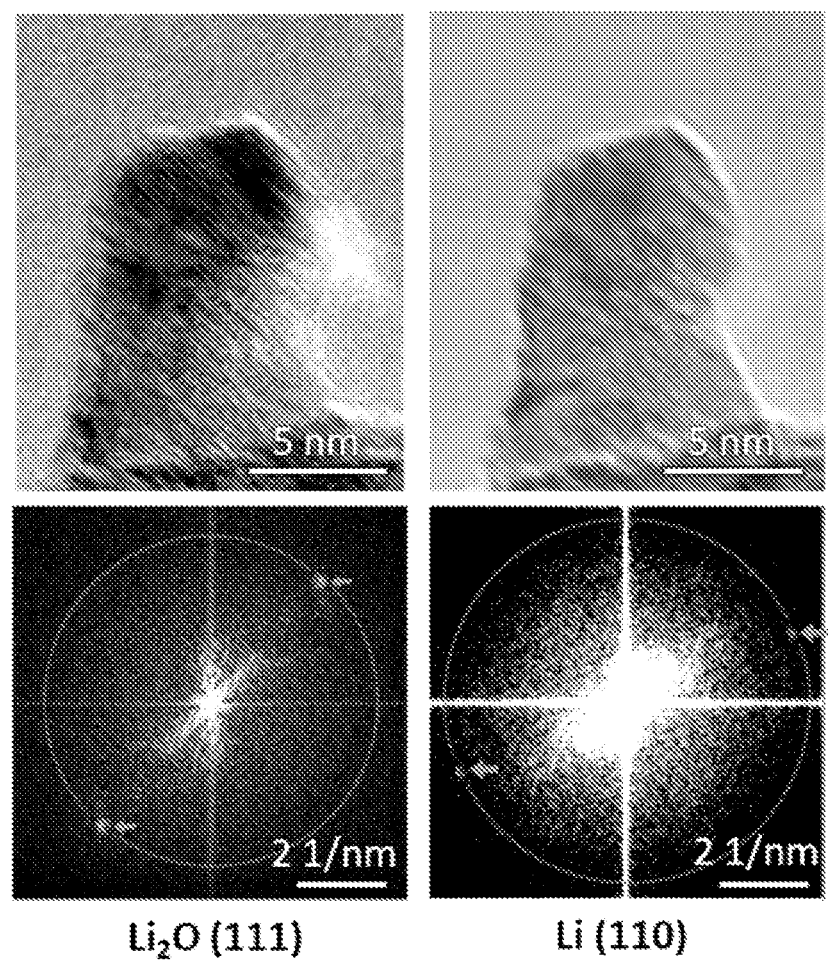
FIGS. 9A to 9C are views illustrating a lithium particle produced during the plating reaction analysis for Example 2 when lithiophobic Cu is used as a working electrode and illustrating a change in shape of a lithium-ion supply electrode when the electrode is exposed to air after the analysis.
Figure 9B:
Figure 9C:
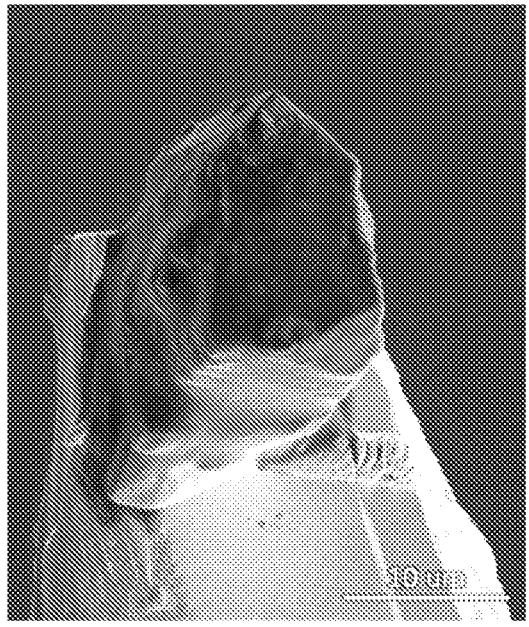

FIGS. 9A to 9C are views illustrating a lithium particle produced during the plating reaction analysis for Example 2 when lithiophobic Cu is used as a working electrode and illustrating a change in shape of a lithium-ion supply electrode when the electrode is exposed to air after the analysis.

Specifically, for the case where Cu, which is a lithiophobic material, is used in the experimental process of Example 2, FIG. 9A illustrates a high-resolution transmission electron microscopy (HRTEM) image (top left) of a lithium oxide ($Li_2O$), a fast Fourier transform (FFT) image (bottom left), a high-resolution transmission electron microscopy (HRTEM) image of lithium (Li) (top right), and an FFT image (bottom right). Since the grown lithium particles are vulnerable to high-intensity electron beams, the changes in diffraction patterns were observed by irradiating the grown lithium particles with high-intensity electron beams.

Referring to FIG. 9A, it is confirmed that the particles grown at the interface between the working electrode (Cu, lithiophobic material) and the lithium-ion supply electrode prepared according to Example 1 are lithium.

FIG. 9B is an image taken immediately after fabrication of the lithium-ion supply electrode of Example 1 before the plating reaction analysis of Example 2, and FIG. 9C is an image taken after seven days of exposure of the lithium-ion supply electrode of Example 1 to air after the plating reaction analysis of Example 2.

Referring to FIGS. 9B and 9C, it is observed that lithium in the lithium-ion supply electrode is oxidized due to exposure to air for a week, resulting in a lithium oxide. The lithium-ion supply electrode is covered with the lithium oxide. Through this experiment, it is confirmed that lithium was present as lithium metal in the lithium-ion supply electrode during the experiment.

The scope of the present invention is defined by the following claims rather than the above detailed description, and all changes or modifications derived from the meaning and scope of the claims and their equivalent concepts should be interpreted as falling into the scope of the present invention.

What is claimed is:

1. A lithium-ion supply electrode comprising:

a solid electrolyte layer comprising a solid electrolyte;

a lithium layer formed on the solid electrolyte layer and comprising lithium; and a protective layer formed on the lithium layer and comprising a metal, wherein a probe is bonded to the protective layer, the lithium layer, and the solid electrolyte layer.

2. The lithium-ion supply electrode of claim 1, wherein the lithium layer has a thickness of 0.5 μm to 10 μm.

3. The lithium-ion supply electrode of claim 1, wherein the metal in the protective layer comprises one or more metals selected from the group consisting of copper (Cu), gold (Au), silver (Ag), and nickel (Ni).

4. The lithium-ion supply electrode of claim 3, wherein the metal in the protective layer comprises copper (Cu).

5. The lithium-ion supply electrode of claim 1, wherein the protective layer has a thickness of 0.5 μm to 10 μm.

6. The lithium-ion supply electrode of claim 1, wherein a cross-sectional area of the solid electrolyte layer that is parallel to the lithium layer decreases with an increasing distance from the lithium layer.

7. The lithium-ion supply electrode of claim 1, wherein the solid electrolyte layer has any one shape selected from the group consisting of a circular cone shape, an elliptical cone shape, and a polypyramid shape.

8. The lithium-ion supply electrode of claim 1, wherein the solid electrolyte comprises one or more selected from the group consisting of an oxide-based solid electrolyte, a sulfide-based solid electrolyte, a phosphide-based solid electrolyte, a silicide-based solid electrolyte, and combinations thereof.

9. The lithium-ion supply electrode of claim 1, wherein the solid electrolyte layer has a thickness of 0.5 μm to 85 mm.

10. The lithium-ion supply electrode of claim 1, wherein the lithium-ion supply electrode is configured to analyze a lithium secondary battery material in a charging and discharging process of a lithium secondary battery using any one selected from the group consisting of a transmission electron microscope, a scanning electron microscope, an optical microscope, and a scanning probe microscope.

* * * * *